(12) United States Patent
Kutter

(10) Patent No.: US 7,340,728 B2
(45) Date of Patent: Mar. 4, 2008

(54) METHODS AND SYSTEMS FOR DIRECT EXECUTION OF XML DOCUMENTS

(75) Inventor: Philipp W. Kutter, Zurich (CH)

(73) Assignee: Applied Formal Methods Institute, Zurich (CH)

(*) Notice: Subject to any disclaimer, the term of this patent is extended or adjusted under 35 U.S.C. 154(b) by 432 days.

(21) Appl. No.: 09/921,298

(22) Filed: Aug. 1, 2001

(65) Prior Publication Data

US 2002/0111965 A1 Aug. 15, 2002

(51) Int. Cl.
*G06F 9/44* (2006.01)
*G06F 9/45* (2006.01)

(52) U.S. Cl. .................... 717/139; 717/115; 717/144; 717/146

(58) Field of Classification Search ................ 715/513; 717/113, 114, 105, 109, 115, 139, 144, 146
See application file for complete search history.

(56) References Cited

U.S. PATENT DOCUMENTS

| | | | | |
|---|---|---|---|---|
| 5,835,712 A | * | 11/1998 | DuFresne | 709/203 |
| 6,173,316 B1 | * | 1/2001 | De Boor et al. | 709/218 |
| 6,188,401 B1 | * | 2/2001 | Peyer | 345/805 |
| 6,370,552 B1 | * | 4/2002 | Bloomfield | 715/513 |
| 6,505,343 B1 | * | 1/2003 | Menon et al. | 717/116 |
| 6,671,854 B1 | * | 12/2003 | Dunsmoir et al. | 715/513 |
| 6,725,425 B1 | * | 4/2004 | Rajan et al. | 715/513 |
| 6,901,431 B1 | * | 5/2005 | Dodrill et al. | 709/207 |
| 6,964,034 B1 | * | 11/2005 | Snow | 717/104 |
| 2003/0187925 A1 | * | 10/2003 | Inala et al. | 709/204 |
| 2004/0034833 A1 | * | 2/2004 | Kougiouris et al. | 715/513 |

OTHER PUBLICATIONS

Ciancarini, P. et al., "An Extensible Rendering Engine for XML and HTML," Computer Networks and ISDN Systems, NL, North Holland Publishing, Amsterdam, vol. 30, No. 1-7, Apr. 1, 1998, pp. 225-237.
"OMG XML Metadata Interchange (XMI) Specification," URL:http://citeseer.nj.nec.com/388952.html Jun. 2000.
Suzuki, J. et al. "Toward the Inoperable Software Design Models: Quartet of UML, XML, DOM and COBRA" Proceedings 4th IEEE International Software Engineering Standards Symposium and Forum (ISESS '99) Best Software Practices for the Internet Age, Proceedings of IEEE Computer Society 4th International Symposium and Forum on Software Engineering Stand, pp. 163-172, 1999.
Kristensen, A., "Template Resolution in XML/HTML" Computer Networks and ISDN Systesm, NL, North Holland Publishing, Amsterdam, vol. 30, No. 1-7, Apr. 1, 1998, pp. 239-249.

* cited by examiner

*Primary Examiner*—Eric B. Kiss
(74) *Attorney, Agent, or Firm*—Fenwick & West LLP

(57) ABSTRACT

The invention relates to a method, system and apparatus for the direct execution of XML-documents by means of decoration of a XML-document, a document type definition (DTD) or their representation as structure tree, respectively, with textual or graphical flow charts. The structure of the XML-document' is reused for, and integrated with, the code processing the XML document.

12 Claims, 17 Drawing Sheets

```
<?xml version="1.0"?>
<!ELEMENT query (reaction, reaction, query?)>
<!ATTLIST query question CDATA #REQUIRED>
<!ELEMENT reaction (setpoints | query)>
<!ELEMENT setpoints EMPTY>
<!ATTLIST setpoints points NMTOKEN #REQUIRED>
```

Fig. 1

```
<?xml version="1.0"?>
<!DOCTYPE query SYSTEM "query.dtd">
<query question="Is Paris the Capital of France?">
        <setpoints points=10>
        <query question="Are you sure?">
                <setpoints points=0>
                        <setpoints points=1>
        </query>
</query>
```

Fig. 2

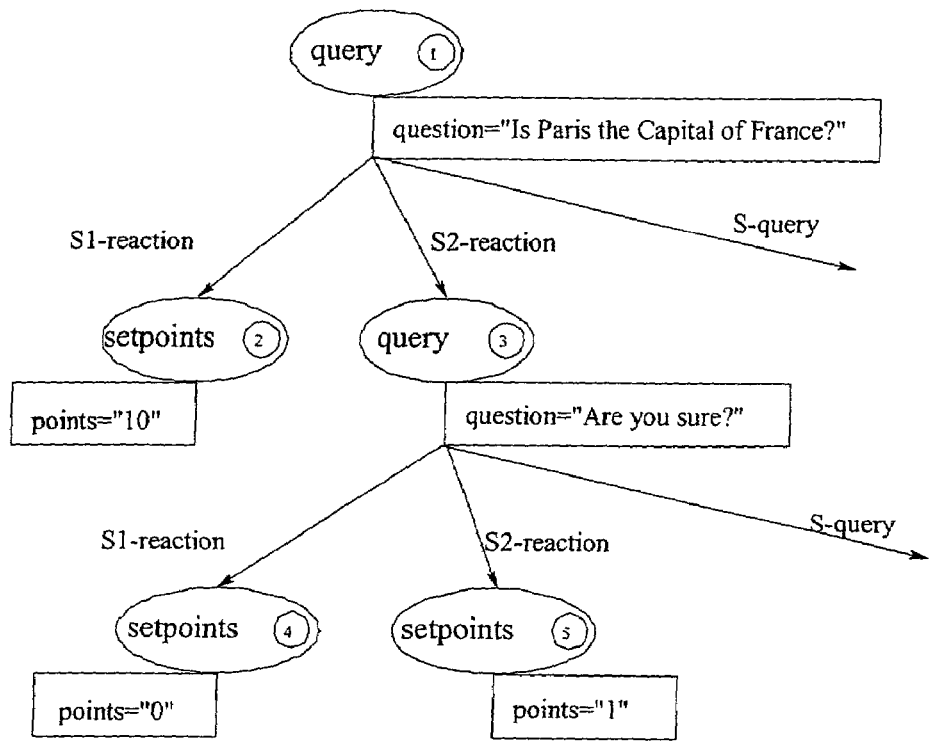

Fig. 3

```
<!ELEMENT   reaction   (setpoints | query)        >
<!ATTLIST                                         >
```

```
<!ELEMENT   setpoints                             >
<!ATTLIST              points NMTOKEN #REQUIRED
```

I ----------→( set )----------▶ T

@set:
    PointCounter := PointCounter + points

```
<!element module (derived*, expression?, state*, module*>
        <!attlist module      name CDATA #REQUIRED
                number CDATA "1">
<!element derived (argument*, expression)>
<!attlist derived name CDATA>
<!element argument EMPTY>
<!attlist argument name CDATA>
<!element state (action*, transition*)>
<!attlist state name CDATA>
<!element transition (expression, path)>
<!element path (component?)>
<!attlist path state CDATA "initial">
<!element component (component?)>
        <!attlist component    name CDATA #REQUIRED
                number CDATA "1">
<!element expression (path | self | src | trg | evalattr | getfirst |
                getnext | parent | root | apply | external | constant>
<!element action (setattr | ifthen | forall | external)>
<!element src EMPTY>
<!element trg EMPTY>
<!element self EMPTY>
<!element evalattr (expression?)>
<!attlist evalattr attribute CDATA #REQUIRED>
<!element getfirst (expression?)>
<!attlist getfirst attribute CDATA #REQUIRED>
<!element getnext (expression?)>
<!element parent (expression?)>
<!element root EMPTY>
<!element apply (expression, expression?)>
<!attlist apply op CDATA #REQUIRED>
<!element external (expression*)>
<!attlist external name CDATA
        language CDATA >
<!element constant EMPTY>
<!attlist constant value CDATA #REQUIRED>
<!element setAttr (expression?, expression)>
<!attlist setAttr attribute CDATA #REQUIRED>
<!element ifthenelse (expression, action*)>
<!element forall (action*)>
<!attlist forall range CDATA "all-elements"
        variable CDATA>
```

Fig. 9 modulequery.xml:
```xml
<module name="query">
        <state  name="initial">
                <transition> <path state="ask"/> </transition>
        </state>
        <state  name="ask">
                <action>
                        <external  name="print" language="shell">
                                <expression> <attreval  name="question"/> </expression>
                        </external>
                </action>
                <action>
                        <setattr name="answer">
                                <expression> <self/> </expression>
                                <expression>
                                        <external name="get(stdin)" language="shell"> </external>
                                </expression>
                        </setattr>
                </action>
                <transition>
                        <expression>
                                <apply op="=">
                                        <expression> <attreval name="answer"/> </expression>
                                        <expression> <constant value="yes"/> </expression>
                                </apply>
                        </expression>
                        <path>   <component  name="reaction" number="1"/> </path>
                </transition>
                <transition>
                        <expression>
                                <apply op="=">
                                        <expression> <attreval name="answer"/> </expression>
                                        <expression> <constant value="no"/> </expression>
                                </apply>
                        </expression>
                        <path>   <component  name="reaction" number="2"/> </path>
                </transition>
        <module name="action" number="1">
                <state  name="terminal">
                        <transition> <path> <component  name="query"> </path> </transition>
                </state>
        </module>
        <module name="action" number="2">
                <state  name="terminal">
                        <transition><path> <component  name="query"> </path></transition>
                </state>
        </module>
        <module  name="query">
                <state  name="terminal">
                        <transition> <path name="terminal"/> </transition>
                </state>
        </module>
</module>
```

Fig. 16

```
module reaction.xml:
<module name="reaction">
        <state name="initial">
                <transition>
                        <expression>
                                <apply op="!=">
                                        <expression> <getfirst name="setpoints"/> </expression>
                                        <expression> <constant value="undef"> </expression>
                                </apply>
                        </expression>
                        <path> <component name="setpoints"/> </path>
                </transition>
                <transition>
                        <expression>
                                <apply op="!=">
                                        <expression> <getfirst name="query"/> </expression>
                                        <expression> <constant value="undef"> </expression>
                                </apply>
                        </expression>
                        <path> <component name="query"/> </path>
                </transition>
        </state>
        <module name="setpoints">
                <state name="terminal"> <transition> <path  state="terminal"/> </transition> </state>
        </module>
        <module name="query">
                <state name="terminal"> <transition> <path  state="terminal"/> </transition> </state>
        </module>
</module>
```

Fig. 17

```
module setpoints.xml:
<module name="setpoints">
        <state  name="initial">
                <transition> <path state="set"/> </transition>
        </state>
        <state  name="set">
                <action>
                        <setattr name="PointCounter">
                                <expression> <getroot/> </expression>
                                <expression>
                                        <apply op="+">
                                                <expression>
                                                        <getattr name="PointCounter">
                                                                <expression> <getroot/> </expression>
                                                        </getattr>
                                                </expression>
                                                <expression> <getattr name="points"/> </expression>
                                        </apply>
                                </expression>
                        </setattr>
                </action>
                <transition> <path state="terminal"/> </transition>
        </state>
</module>
```

Fig. 18

METHODS AND SYSTEMS FOR DIRECT EXECUTION OF XML DOCUMENTS

CROSS-REFERENCE TO RELATED APPLICATIONS

This application claims priority to PCT Application No. PCT/IB00/01087 of Kutter, filed Aug. 2, 2000, and entitled "XML Robot," which is incorporated herein by reference in its entirety.

FIELD AND BACKGROUND OF THE INVENTION

The invention relates to a method, a system and apparatus for the direct execution of XML documents.

XML-basics

Extensible markup language (XML) is a subset of the standard generalized markup language (SGML) format. In short, XML allows a developer to define the format of documents structured by means of so-called tags. While XML defines both a physical and a logical structure of documents, one embodiment of the present invention focuses on the logical structure of an XML document. Abstracting from the physical structure, XML allows for the creation of an XML document and, optionally, an associated document type definition (DTD). A DTD spells out structural rules for an XML document. An XML document is "valid" with respect to the DTD if the XML document obeys the rules of that specific DTD.

The logical aspects of a DTD define elements and attributes. Each document of such a type contains only instances of the defined elements, and the attributes and the composition of the element instances comply with the DTD's specification. As an example, a DTD T defining an element A, with a composition of subordinated elements X, Y, and Z and attributes b and c of element A might be noted in XML as follows:

<!ELEMENT A (X, Y, Z)>

<!ATTLIST A b#PCDATA c#PCDATA> where #PCDATA defines the kind of data admissible for attributes b and c. A XML document that is valid with respect to the DTD T described above may contain instances of element A. An instance of the element A consists of the start-tag <A . . . > and an end-tag </A>. Within the start-tag, the values of the attributes are given, and between the start and the end tag, instances of the composing elements are given. A document of type T may thus contain instances of A as follows:

<A b="string 1"c="string 2">

<X . . . > . . . </X>

<Y . . . > . . . </Y>

<Z . . . > . . . </Z>

</A> where the composition of X, Y, and Z instances is given by corresponding element definitions in the DTD T.

The power of XML stems partly from the fact that an element's composition can be recursive. For illustration, some composition possibilities expand on the example above. The already used sequence (X, Y, Z) indicates that an X element is followed by a Y element, which in turn is followed by a Z element. Another important composition operator is the choice operator, |, e.g., (X|Y|Z) indicates a choice between an X, Y, or Z element. Other operators include the + and * operators, indicating repetitions of a component. However, they are not used in the present examples.

Assuming that Y and Z have no composition, i.e., in XML notation, (<!ELEMENT Y >, <!ELEMENT Z>), the definition of X completes the DTD T for the element A. The definition of X uses the choice composition and recursion to element A: <!ELEMENT X (Y|A)>. Thus, X is either a Y or an A. Possible documents of type A are:

<A b=". . . "c=". . . "><Y></Y><Y></Y><Z></Z>
        </A>

<A b=". . . "c=". . . "><Y></Y><Y></Y><Y>
        </Y><Z></Z></A>

<A b=". . . "c=". . . "><Y></Y><Y></Y><Y>
        </Y><Y></Y><Z></Z></A>

<A b=". . . "c=". . . "><Y></Y><Y></Y><Y>
        </Y><Y></Y><Y></Y><Z></Z></A> and further repetitions of <Y></Y>. For simplicity, the examples did not use special composition operators, such as +and *, for repetition. As a shortcut <Y> </Y> can be replaced by <Y/>.

XML is the outcome of a long standardization process. Developers widely use and accept XML. Many important XML implementations fall into one of two categories: data exchange and document publishing. For data exchange applications, XML can define data formats for exchanging complex data between two programs. Furthermore XML can provide an exchange format for data residing in relational database systems. Examples for such formats are XML-data from Microsoft, meta content framework (MCF) from Netscape, and resource description framework (RDF) from the world wide web consortium (W3C).

For document publishing applications, XML is a data language for markup of all kind of documents. XML markup indicates the logical content of a document. Associated generic layout languages, such as cascading style sheets (CSS) and Extensible Stylesheet Language (XSL), provide layout information generically for the DTDs. The output of the generated layout may be hypertext transfer protocol (HTTP), standard page description language (SPDL), or Postscript, respectively.

XML Processing

Currently existing software and applications are using XML for the representation of data and documents, which are then processed by general purpose programming languages. Existing proposals for the processing of XML-documents typically involve event-driven or tree-manipulating techniques. The choice of which processing technique to use is independent of whether the application lies in the data-exchange or document-publishing domain. In an event-driven approach, the document is processed in strict sequence. Each element in the data stream is considered an event trigger, which may precipitate some special action on the part of the application. The simple application program interface (API) for XML (SAX) can implement an event-driven approach in an existing programming language.

The tree approach provides access to the entire document by parsing a document according to a structure tree. Basically, the elements of an XML-document are the nodes of the tree, and the components of each element are the siblings of the node. The commonly used API to access such a tree is the document object model (DOM) programming interface specification. A DOM uses standard syntax to describe a document as a series of objects. Programming languages such as JavaScript, VBScript, C++, and Java can then access the DOM for a document, obtain a particular object, and manipulate the object.

However, a program that uses an API to access a XML document is typically a complex, general-purpose program. Such a program is typically complex because it takes into account system and platform dependencies, and reliability and security concerns. Several XML tools try to hide this complexity by generating special code for data exchange or document publishing applications. Although these tools may help to easily generate a program pattern in a traditional programming language, they do not abstract completely from using explicit programming to navigate through the document that has to be processed. Thus, there is a call for a system that reduces the need for complex, general purpose programming that results from using APIs to access a XML document.

XML versus Traditional Programming

Traditional structured as well as object oriented programming methods use unstructured data sources. These programming methods use unstructured data in the sense that the structure of the data is not given by means of production rules. In contrast, the element definitions in XML or Backus Naur Form (BNF) rules define the structure of programs. Unstructured data sources are, in the case of traditional programming, used in connection with a structured, yet independent, program. On the other hand, object oriented programming methods combine the structured segmented code with data objects, but still the object space (data) is not structured in the above-mentioned sense.

It would, of course, be possible to use structured data models in connection with these methods. However, even if the data models have structure, the program structure is still independent of the data structure and therefore needs complex treatment as described above. In fact, the current situation in processing XML-documents implies two independent structures, one of the XML-document and one of the program processing it. This approach suffers at least two disadvantages: (a) If a programmer intends to reliably process the complete structure of any instance of a DTD, such code may fail due to the variety of corresponding XML-documents and the complexity of such tasks and (b) the program processing the XML-document is typically designed to process all documents of a certain DTD. In other words, the inherent generic nature of the code increases the complexity of the program.

Consequently, it is an object of the invention to create a method, system and apparatus to improve the processing of XML-documents by incorporating data and software in an integrated structure. Incorporating data and software in an integrated structure reduces programming complexity and reduces the need for fundamental programming knowledge to achieve data processing and to reuse the existing structure of the XML-document.

Another object of the invention is to provide a new and general method, system and apparatus to generate such integrated data and software structures for XML-documents. Yet another object of the invention is to provide a novel method, system and apparatus to directly execute standard document structures, i.e., XML-documents.

SUMMARY OF THE INVENTION

This invention achieves the objectives described above by providing methods and systems for the direct execution of XML documents.

Methods and systems according to one embodiment of the invention use executable software and data in a coordinated and integrated structure. The current invention may be considered as an application, but does not fall in either of the categories mentioned above, i.e., data exchange applications or document publishing applications. In contrast to such existing applications, this invention provides a method and apparatus to directly execute (or otherwise process) an XML-document.

The present invention reuses the existing structure of the XML-document while avoiding a new structure and concept for the program that processes the XML document. Accordingly, the inventive approach defines one program for each document (in contrast to one for all documents valid with respect to a particular DTD) and thus reduces the complexity of the program.

Decorating a given XML-document, and/or its document type definitions (DTD), with executable instructions allows direct execution of XML documents. The executable instructions define the local behavior and process for each tag or for each node, respectively.

Incorporating the program instructions into textual form and/or graphical charts specifying sequential or concurrent control and data flow achieves the decoration. Specifically, methods and systems according to one embodiment of the invention perform the incorporation of the program instructions such that the instantiation of instructions of an XML-robot apply to a specific XML-document. The application of the instantiation of instructions of a XML robot results in an executable XML-document containing the complete execution behavior of the XML-document.

One embodiment of the invention uses a general DTD specifying the module structure to be used for modules of the XML-robot. A developer then constructs an XML robot specification according to the general DTD. Applying procedures and specifications given in the XML-robot to the XML-document processes the XML-document. Thus, this embodiment incorporates the modules into the structure of the XML-document in such manner that this embodiment directly executes the XML-document. The execution relies on a few functions (primitives) that define how to access and how to alter a given XML-document. Furthermore, a specific and unique flow chart completely defines the execution process of the XML-document. These basic inventive definitions are complete, in the sense that the given examples of XML-robots lead to the direct execution according to the invention.

Another embodiment of the invention provides the full information for each kind of element of a given XML-document by means of a graphical flow chart (GFC). A GFC defines the control flow through the elements and components, respectively, and which actions are executed during that control flow. Actions executed upon reaching certain states of the GFC provide data flow. Examples of a GFC are flow charts, Finite State Machines, State Charts, Unified Modeling Language (UML) State Machines, all kinds of Petri Nets, UML action diagrams and other kinds of computational models.

Presenting the XML-document as a structure tree defines and explains this embodiment in a purely graphical manner, allowing for an advanced visual integrated development environment for XML-robots. Inductive nesting of graphical fragments according to a structure tree generates a hierarchical GFC.

On the other hand, for sequential GFC models (flow charts, Finite State Machines) executing actions on states, this graphical embodiment directly maps into an embodiment using a textual form. In addition, the embodiment using a textual representation can generalize to a model allowing for concurrency (i.e. allowing parallel execution of multiple actions) and actions on arrows (i.e. actions on transitions of finite state machines), such that all variations of the textual embodiment can map into the graphical embodiment.

A modular structure characterizes both the graphical and textual embodiments, where each module defines the execution behavior for all elements of a specific tag, e.g. <A . . . >, while adding execution behavior for components of such elements, and furthermore adding execution behavior for all instances of elements with other tags, e.g. <B . . . >. All information in a module, whether textual or graphical, is relative to an instance of the described kind of element (<A . . . >), called the self-element.

In both embodiments, primitives are provided to call external functions, navigate through the structure of the document/tree, ranging over all instances of a certain kind of element (<A . . . >), and defining additional attributes of the document/tree, whose definition is given in a purely functional style. If there exists a DTD for the XML-document to be executed, this DTD provides explicitly the information about which types of elements exist, and which components are present for those element types. Thus, such a DTD provides structure and guidance for writing an XML-robot specification. Although both embodiments work without an explicit DTD, a DTD is used for the definitions and specification of the first embodiment described below. Furthermore, one can derive a simple DTD from an XML-document without a DTD.

In certain embodiments, dynamically creating and redefining attributes of the elements in the document, or in the nodes of the structure-tree, stores intermediate results. Other, event based and purely functional/declarative models are possible as well. However, the existing document/tree structure preferably gives the dynamic process information. In contrast to existing processing models, the document or the structure tree of the XML-document is the basis for a GFC (or a corresponding textual form). The GFC defines the execution behavior of the XML-document. Thus, such an XML-robot is a basic new way of applying XML technique and processing XML-documents.

Since the invention is not restricted to specific platforms or concrete implementations of the process, e.g. to existing API's such as SAX and DOM, the specification given here abstracts from such concrete forms. Nevertheless, the primitives used are defined such that one can implement them. Furthermore the invention is not restricted to specific programming languages implementing the flow chart or other structural implementations, such as whether the programming languages generate intermediate forms/results, or whether a compiler or an interpreter, or both, execute the XML-document.

BRIEF DESCRIPTION OF THE DRAWINGS

FIG. 1 shows an Example for a DTD named "query".

FIG. 2 shows an XML-document valid with respect to the example DTD according to FIG. 1.

FIG. 3 shows the tree structure of the XML-document in FIG. 2 as implied by the DTD "query" as given in FIG. 1.

FIG. 9 shows the unique DTD defining the module structures.

FIGS. 16-18 show the textual representation of modules of the example according to FIG. 1ff.

DETAILED DESCRIPTION OF THE ILLUSTRATED EMBODIMENTS

The invention realizes the direct execution of an XML-document. The following embodiments describe a graphical and a textual realization of the invention. Even though the subsequent examples relate to XML-documents of a given and known DTD, the invention, taking into consideration certain disadvantages such as undefined results, allows the execution of an XML-document without a pre-known DTD. In any case, embodiments of the invention incorporate the DTD (if pre-known) or the XML-document directly with the XML-robot specification ("decoration" of the DTD or XML-document). The invention is, as described above, basically independent from the concrete implementation (platform, program languages, structural forms such as storing and processing). However, where applicable, embodiments using a specific implementation are described below.

FIGS. 1 to 8 Illustrate a First Graphical Embodiment of the Invention

FIG. 1 shows a sample DTD with an element query having three components, two of type action and an optional component of type query. The attribute list of the element query consists of the single attribute question, being a required character data attribute. The element action is composed by either of the elements setpoints or query. The element setpoints has no components and the single attribute points.

FIG. 2 represents a valid document with respect to the sample DTD of FIG. 1 while referring to the DTD "query.dtd" as given in FIG. 1. This instance is used as a sample document for the further description below.

FIG. 3 shows a corresponding possible mapping of the document in FIG. 2 to an attributed structure tree (AST). Such an AST is an alternative graphical representation of the structure of an XML document. The nodes numbered 1 and 3 are instances of the element query. They have the two required action siblings accessible as S1-action and S2-action, and the optional query sibling is not present. If a query sibling would be present, it would be accessible as S-query. Nodes 2, 4, and 5 are instances of the element setpoints that do not have siblings. Attributes and their values are visualized within boxes.

Figure 4:
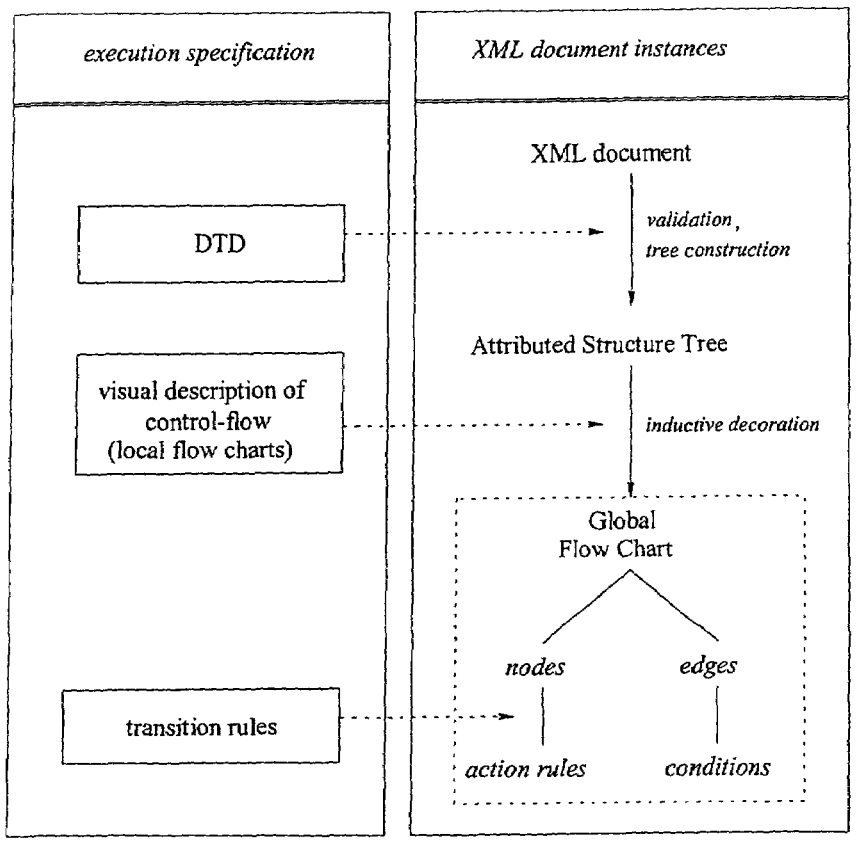
FIG. 4 shows a graphical specification and its corresponding instantiation of the DTD according to FIG. 1.

FIG. 4 shows how an execution specification for a DTD interacts with instances of the DTD, i.e., XML document instances, to execute an XML document. The specification includes the DTD for the XML document, and, preferably, graphical flow charts (GFC) and actions triggered if certain states of the GFCs are reached. The box on the left side represents an execution specification for a DTD that includes pure DTD components, definitions (visual description) of graphical flow charts (GFCs) and transition rules. The transition rules operate or fire when the control flows through the GFCs. Alternatively, the same specifications can be given for the element instances of an XML-document without a DTD.

The box on the right side illustrates how this structure implies the direct execution of an XML-document. An embodiment of the invention uses the DTD, if existing, to validate the XML-document. The embodiment then constructs an attributed structure tree (AST). This embodiment uses the GFCs to decorate the AST, resulting in a global flow chart corresponding to the parsed XML-document. Executing the GFC, e.g. triggering the actions associated with certain states of the GFC and processing the control flow according to the conditions within the GFCs, executes the XML document.

A complete execution specification consists of specification modules. Each specification module corresponds to an element declaration describing the execution behavior of that element, together with additional execution behavior for the components of that element, and for the instances of other element kinds.

Figure 5:
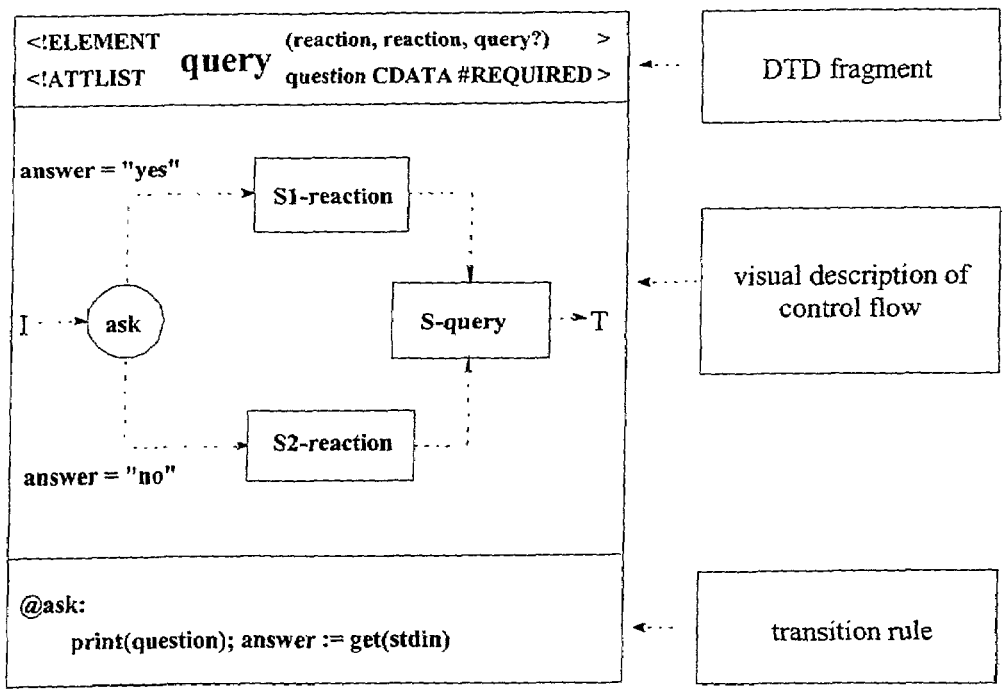
FIG. 5 shows a specification module, encapsulating the information on the left side of FIG. 4 for the element definition "query".

FIG. 5 illustrates a specification module for the query element according to FIG. 1. The uppermost part of the specification module contains relevant element and attribute definitions. The middle part gives a GFC fragment specifying the execution behavior for instances of element query. The GFC fragment is given using the method of a graphical representation. Finally, the transition rule is shown in the bottom part of FIG. 5.

With reference to FIGS. 4 and 5, the preferred method of using a graphical representation of the sample DTD of FIG. 1 is now described in more detail. The example shown represents a GFC with a sequential control, comparable to Finite State Machines, State Charts, classical flow charts, or UML state machines. The procedure works in a similar way for distributed GFCs, such as variants of Petri Nets, or UML activity charts. In the illustrated embodiment, the execution behavior of an XML-document is given by means of a sequential graphical flow chart whose states are associated with actions. In alternative embodiments arrows of the GFC may be associated with actions. In the present embodiment, at any state of the GFC, the corresponding actions fire, followed by a state transition to the next state. As in other state based formalisms (such as Harel's Statecharts), in the present GFC, the control arrows can be labeled with Boolean predicates, which determine the flow of control such that labels may be omitted. A control arrow without a label has a default behavior, e.g., if no other arrow originating from its source has a label evaluating to true, then the unlabeled arrow evaluates to true or active.

As shown on the left side of FIG. 4, a behavior or execution specification of a DTD consists of three parts: the DTD definition itself, a visual notation for specifying the GFCs, and the specification of the actions. In addition, there may be a specification for calculation of additional attributes before the execution. The additional attributes specification is preferably given by functional dependencies, and security conditions, depending on the attributes defined by the DTD and by the specification of additional derived attributes.

The DTD is used to generate a parser, and then a parsed XML-document is mapped in a canonical way into an AST. The second part of a specification describes the control flow in terms of state transitions in a GFC. A visual description is associated with each element declaration of the DTD, defining a local GFC and also specifying how this GFC can be plugged into a global GFC via an inductive decoration of the AST. Toward this end, each node of the AST is decorated with a copy of the GFC fragment given by its graphical representation. The references to descendants of a node define an inductive construction of the global GFC as described below in connection with its execution (cf. FIGS. 7 and 8). Finally, the last part of the specification consists of transition rules, specifying the actions fired during execution of the document. Any state of the GFC may be associated with a transition rule, which is fired when this state is reached. The transitions in the GFC are conditional, the conditions being built up from attributes of the nodes of the AST.

The GFC in FIG. 5 contains a round node representing a state called "ask". If that state is reached, the corresponding action in the lowest part of the module is triggered. Then the control either flows to the box labeled S1-action or to the box labeled S2-action, depending on the conditions labeling the flow arrows. The boxes represent the GFCs corresponding to the siblings referenced by their labels. The I and T arrows represent entry and exit point of the control flow.

I and T are treated like normal states called "initial" and "terminal". The arrows from I and to T have to be given explicitly as transitions from "initial" and to "terminal," respectively. Further, arrows into boxes are given explicitly as arrows to the "initial" state of the box. Arrows departing from boxes are given explicitly as arrows departing from the "terminal" state of the box. This correspondence may be easily understood below in connection with FIGS. 7 to 8, which show the GFC in graphical form.

FIG. 6 shows the specification modules action and setpoints of the example DTD of FIG. 1. While action is just the choice between setpoint and query, and thus it inherits the GFC definitions of these element definitions, the setpoint element module introduces a trivial GFC consisting of one state. The action corresponding to this state increases the value of a PointCounter by the number given by means of the attribute points.

As noted the visual notation in each specification module contains the information about the local GFC to be associated with each node of the AST corresponding to the specification module, and the information required to embed this GFC into the global GFC which corresponds to the input document.

Figures 6A, 6B, 7:
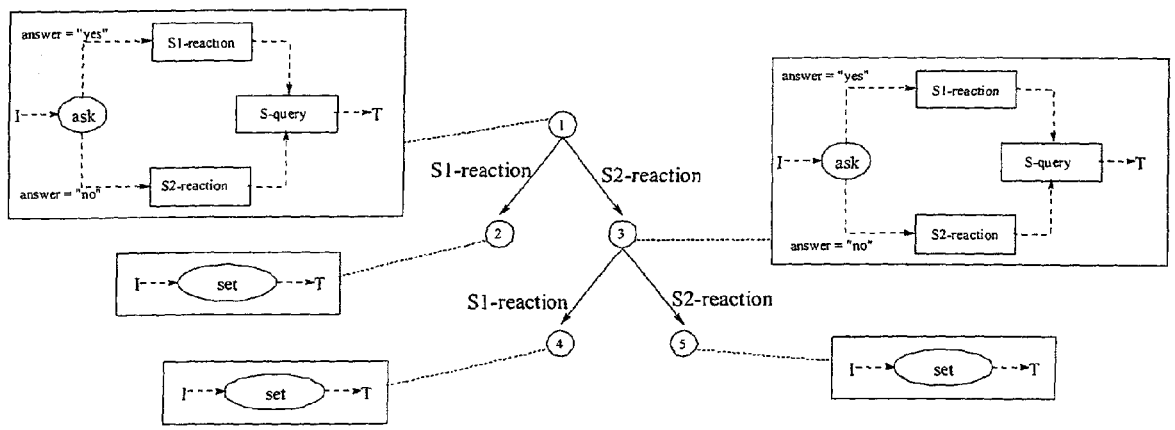
FIGS. 6a and 6b show the specification modules for the element's "setpoints" and "action".
FIG. 7 shows how the local GFCs of each element definition are instantiated for each instance of such an element in the structure tree.

FIG. 7 shows how the graphical fragments from each of the graphical representations are associated with the nodes of the AST corresponding to the example document and thereby illustrates how a global GFC may be obtained from an AST by matching the GFCs according to FIG. 5 and FIG.

6 with the corresponding nodes of the AST of FIG. 3. One sees two instances of the GFC fragment given by the module query (cf. FIG. 5), and three instances of the trivial GFC fragment given by the module setpoints (cf. FIG. 6). Again, this figure shows the decoration of each node in the AST, which is reached by a graphical representation. Such graphical decoration can achieve the control flow. However, the invention can also use solutions where textual program instructions or other means would replace the control flow and triggering of actions that are achieved using the graphical flow charts.

Figure 8:
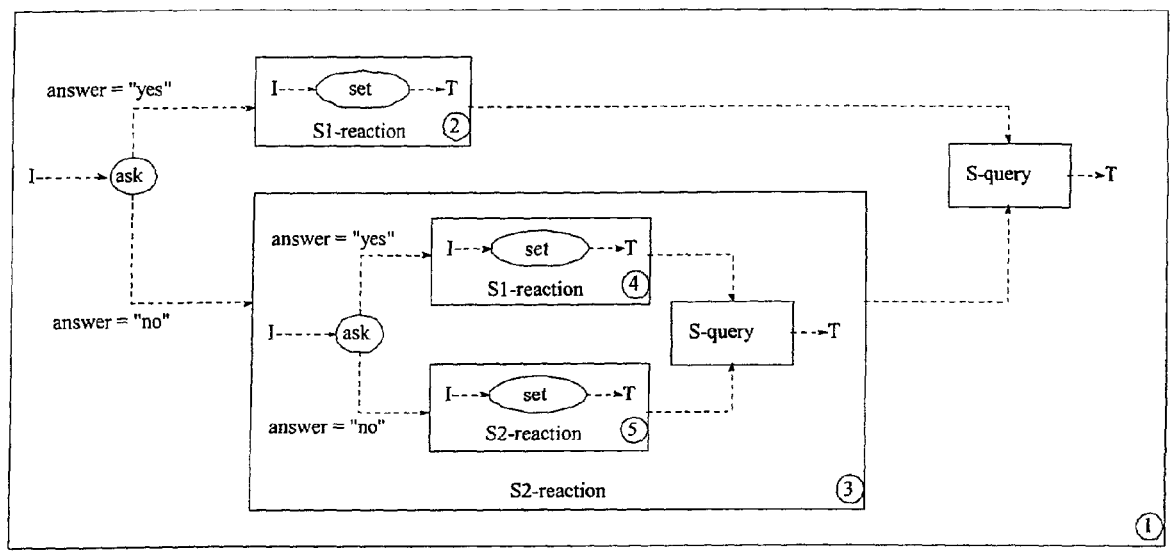
FIG. 8 shows how the instances of the local GFCs are connected to a global, hierarchical GFC.

FIG. 8 shows the hierarchical GFC resulting from an inductive nesting of these fragments of FIGS. 5 and 6. The GFC fragments in FIG. 7 contain boxes with references to siblings. Resolving these references achieves the nesting.

A more detailed understanding of the visual notation used herein for the control-flow should be given by the following specification. The semantics of the graphical notation used in the specification modules can be described as follows:

There are two kinds of nodes: ovals and boxes. The ovals represent the ordinary states of the GFC. The ovals are labeled with an action name. When the program enters a state, the action, specified using transition rules, operates or fires. The boxes correspond to superstates, which are GFCs themselves. In other words, a box represents a GFC that can contain other ovals and boxes and that can contain one or more states. The boxes correspond to the nodes of the AST. This direct one-to-one correspondence of superstates in the GFC and nodes in the AST is the detailed embodiment of the identification of the structure of the AST and the structure of the execution behavior. Of course the described use of boxes, the reference of them to components, and the one-to-one correspondence of superstates in the GFC and nodes in the AST is independent of the specific form of a GFC, the flow conditions, and the actions.

The boxes are the GFCs corresponding to the components on the right-hand side of the element definition. The definition of a GFC is given in the specification module corresponding to the respective elements. The arrows correspond to edges in the hierarchical state transition graph of the generated GFC. The source and the target of an arrow can be either a box or an oval. In addition, there are two arrows, one with its source marked as I (for Initial) and target as a box or an oval, and the other with its target marked as T (for Terminal) and its source as a box or an oval. The arrow marked with I indicates the entry into the local GFC and that marked with T indicates the exit from the local GFC. A transition to a superstate of the GFC results in an entry to the first state of the GFC (marked by the I arrow), which constitutes this superstate.

The boxes in the visual description in each specification module are references to the corresponding GFC. Resolving these references for the decorated example document described in FIG. 7 leads to the GFC shown in FIG. 8. This generated hierarchical GFC gives the execution behavior of the XML-document and a direct execution of the hierarchical GFC is possible, allowing a direct execution of an associated XML-document. The ability to directly execute XML-documents does not depend on the specific kind of GFC shown in the present embodiment and any form of GFC that may be executed directly is suitable.

In the example form of GFC, like in statecharts, a hierarchical state is entered at the initial state, which is indicated by an I arrow. If the final state (marked with an outgoing T arrow) is reached, there is a transition to a state that is one level above in the hierarchy.

Thus, the execution of the hierarchical GFC in FIG. 8 works as follows. The control enters the root of the structure tree, i.e. node 1. The initial state of the corresponding GFC is the ask-state within node 1. The question attribute of this node is "Is Paris the Capital of France?" After triggering the ask-action, the answer attribute should be set either to "yes" or "no". If answer equals "yes", control follows the upper control arrow exiting the ask-state, and enters superstate 2. The initial and terminal state of superstate 2 is the set action. After executing the set action and leaving superstate 2, the (optional, and actually non existing) S-query sibling is visited, not triggering any action, and superstate 1 is left. If the answer to the question in the ask-state of superstate 1 was "no" the superstate 3 is entered, and the initial state ask of superstate 3 is visited. This time the question "Are you sure?" is asked. If the answer is an insisting yes, the PointCounter increases by 0 otherwise the PointCounter increases by 1 (superstates 4 and 5).

In one embodiment of the invention, the states are handled by means of data cubes. The transition rules for the actions redefine the content of such data cubes pointwise. This may be better understood by assuming a simplified model of an imperative programming system. A multidimensional database gives the state of the system. The database consists of n-dimensional cubes. The content of a n-dimensional cube f can be read by the following term $f(t_1; : : : ; t_n)$ where $t_1 : : : t_n$ indicate positions in the first to nth dimension of the data cube, respectively. A normal variable corresponds to a 0-dimensional cube, whereas arrays and records correspond to a 1-dimensional cube.

Data cubes can store a variety of data types such as integers, reals, Booleans, or anything else needed in a specific application. For instance, data cubes can store the nodes of a structure tree, or dynamically generated objects. One-dimensional cubes model the attributes of the nodes of the structure tree. Thus, the value of an attribute of a node n can be retrieved by a term a(n). For convenience the dot notation which is used in attribute grammars and object-oriented programming, e.g., n.a, instead of a(n), can be used.

For instance a basic update rule is of the form $f(t_1; : : : ; t_n):=v$ where $f(t_1; : : : ; t_n)$ and v are terms built over the cubes in the system. The semantics of such a rule is to update the cube f at the position of given coordinates to v. The rules can be composed either sequentially, or in a parallel fashion, so that the corresponding updates are all executed at once. Apart from the basic transition rule shown above, there may exist other transition rules. According to conditional rules, the firing of an action depends on the evaluated Boolean condition-term. Do-for-all rules allow the firing of the same rule for all the elements of a certain kind. Choose rules the choice of one element of a certain kind. Lastly extend rules introduce new elements. More complex transition rules are recursively built up from these rules.

The process of executing the transition rules is now described more in detail, still with reference to FIG. 8. It is possible to trace the execution of the sample program using the action rules given in the graphical representations in FIGS. 5 and 6. The initial state is a simple state labeled with action ask, the entry into this state being marked by the I arrow in the graphical fragment attached to the root node of the AST. The ask action specified in the query-module was described above (cf. FIGS. 3 and 5) and results in printing the question, available in the attribute question: "Is Paris the Capital of France?". Then a user input is obtained (e.g., get(stdin)) and the attribute answer is set to the provided input.

After this action rule is executed, the conditions on the outgoing arrows from this state are evaluated. Two arrows leave from the ask-state, one labeled with the condition answer="yes" and the other with the condition answer="no" Depending on the value of the answer the corresponding arrow is followed, leading to the superstate node 2, or the superstate node 3. Assuming the answer was "no," one would follow the lower arrow, entering in the superstate 3. Since this is a superstate, it leads to a sequence of transitions through the states of the flow chart that constitutes the superstate.

In this case, the initial state inside this superstate is again a simple state shown with the oval, which is again labeled with the action ask. This time the question attribute is printed to ,"Are you sure?". Depending on the answer of the user, either node 4 or node 5 is followed next. These nodes are superstates, containing one single state labeled by action set. This action adds as many points to the 0-dimensional cube as specified with the points attribute. Consequently, a user answering "yes" to the initial question gets 10 points, a user answering "no", and then "yes" gets 0 points, and a user answering "no" to the first question and "no" to the second gets 1 point. Due to the structure of the generated GFC, a user answering "yes" to the first question will never be asked the second question.

More abstractly, a XML-document is thus executed by generating its GFC as described and then starting with the initial state (or states in case of concurrent execution) of its root element. The initial state is found by entering the superstate, corresponding to the root of the document, and following the I arrow. If the I arrow leads to a normal state, this state is entered, otherwise the I arrows are followed recursively. If the initial state is entered, its action is triggered. Then the conditions on the outgoing control arrows are evaluated and an arrow (or several arrows in the concurrent case) with satisfied condition is chosen. If the arrow leads to a normal state, this state is executed, and the procedure is repeated. If the arrow leads to a superstate, the I -arrows are followed recursively to determine the next state to execute and the procedure is repeated. If the arrow is a T arrow, the superstate is exited, and one of the outgoing arrows of the superstate with satisfying condition is chosen. This arrow is followed again as described above.

Thus, the composition of the action for an XML-element definition is either represented by graphical and/or textual, sequential or concurrent control- and/or data-flow charts. Special textual and/or graphical means are provided to refer to the components of the XML-element definition. The textual or graphical means allow for synchronous and/or asynchronous execution of the actions of the components. Thus, the structure of the document, given by the components in each element definition, is reused directly in the structure of the execution, given by the triggering of actions of components. Furthermore, special graphical and/or textual means for defining the sequential or concurrent execution order of action composition may be provided together with conditions guarding certain execution paths of a specified order. These special graphical and/or textual means may be contained within the definition of conditions and actions or referencing the node for which the action combination is defined, for referencing its components, and for referencing its attributes, given by the XML-attribute definitions.

With reference to FIGS. 9 to 18 a second textual embodiment of the invention is now described.

FIG. 9 shows the unique general DTD for the XML-robot modules representing execution behavior of XML-documents according to the invention. Hereinafter, with reference to FIGS. 9 to 18, an embodiment using a textual realization of the invention is described more in detail. In order to describe FIGS. 9 to 18, the required syntax and primitive functions are defined and explained below. The following definitions are focused on the textual (text-based) realization.

A XML-document to be executed is named "doc.xml" and the XML-robot is defined by documents given the file names "moduleX.xml", if the element name is X. Further it is assumed that all those files may be freely changed by the flowcharts shown in FIGS. 10$f\!f$ explaining the execution of doc.xml. The state of the execution consists of the mentioned documents, and the values of eleven global variables, here named cur, mod, state, derived, subcur, submod, curstate, action, trans, src, and trg. The execution alters the given documents by creating and redefining attributes, and by pasting the state elements of the modules into the document "doc.xml". Further the values of the global variables are redefined (updated) during the execution. For instance, the execution can update the global variable cur from the value v1 in state 1 to the value v2 in state 2. In the present definitions, the values of the global variables are references inside the XML-documents or the constant undef.

The XML-document to be processed uses the standardized structure described before, containing elements with start and end tags of the form <A . . . > . . . </A>. References to elements are pointers inside the documents. The references could be implemented using (a) text positions (which should be updated if further text is pasted inside the document), (b) existing reference mechanisms in the XML link definition, (c) pointers to objects in an object model of XML-structure-trees, such as DOM, or the trees described in the embodiment using GFC.

For a better understanding of the execution process the focus may be set on an element's attributes. As an example, the attribute aa of an element A having for instance a value "13" is given as follows: <A aa="13"> . . . </A>. To read the value of the attribute, the general DTD of FIG. 9 provides a function evalAttr(_,_). EvalAttr(_,_) takes two arguments, a reference to an element and an attribute name, and returns the value of the attribute. Assuming doc.xml contains the referenced element A and r is a reference to that element, the term evalAttr(r, "aa") evaluates to "13". The syntax "r.evalAttr("aa")" is equivalent to evalAttr(r, "aa"), and analogue syntaxes for other actions are used in the FIGS. 10$f\!f$ and the description for convenience.

The execution of the XML-document as described in the following paragraphs requires the attributes to be dynamically updated and/or created. Thus, the general DTD of FIG. 9 provides a procedure setAttr(_,_,_), taking three arguments: the first is a reference to an element, the second is a reference to an attribute name, and the third the new (initial) value of the attribute to be updated (created). E.g. the action r.setAttr("aa", "15") transforms the document doc.xml such that said element A, referenced by r, becomes the form <A aa="15"> . . . </A>. An action r.setAttr("bb", "7") would transform the document doc.xml such that the element referenced by r has the form <A aa="15" bb="7"> . . . </A>. If both actions are triggered in either order, the resulting form of the element referenced by r becomes <A aa="15" bb="7"> . . . </A>. In this embodiment, the referenced elements are parts of a physical document, for instance doc.xml, and the transformation of said element results in a destructive, non-reversible change of the XML-document.

Furthermore, in addition to standard values v existing in XML, such as strings and numbers, attributes may be set to values that are references to (other) elements in documents, as for instance the reference r in the above examples. As mentioned such references may be implemented in various ways, as long as the execution of action r1.setAttr(a,v) causes the term r1.evalAttr(a) to evaluate to v, until another action r1.setAttr(a, v') is triggered to the same element r1, and the same attribute a, but with a different value v'.

An action "PasteInside" is used to paste text into an XML-document. The action has two arguments, the first is a reference to an element and the second is the text to be pasted. The text is pasted right after the start tag of the referenced element. Given again a reference r, the action r.pastInside("textsample") transforms the referenced element A inside doc.xml into the following form: <A aa="13"> textsample . . . </A>

An action "Copy" is used to create a string from a reference. Given again the above example of a reference r pointing to an element A in doc.xml, the term r.copy evaluates to the string "<A aa=13> . . . </A>", which is syntactically identical to the referenced element, but physically different. If an element is copied, the attributes of the element remain the same, but the reference to the copied element remains pointing only to the document where the copy is taken from.

The actions PasteInside and Copy are used to copy parts from one document into another document. Given two documents

```
doc1.XML:
    <A>
        <B> <A></A>
        </B>
    </A>.
doc2.XML
    <C>
        <D> <C a=""12"" b=""2"">
                <D></D>
            </C>
        </D>
    </C>
``` and references r1, pointing to the element B of doc1.XML and r2 pointing to the inner element C of doc2.XML, the action r1.pasteInside(r2.copy) results in a transformed doc1.XML:

```
<A>
    <B> <A></A>
        <C a="12" b="2">
            <D></D>
        </C>
    </B>
</A>.
``` whereas doc2.XML remains unchanged. Attributes of the element C, referenced by r2, are copied, but references into doc2.XML are not changed.

Given a physical document, e.g. the file doc.xml (or one of the moduleXYZ.xml files),the term getRef("doc.xml") references the root of the document, e.g. the outermost start/end tag couple. Furthermore, the term r.getLabel evaluates to the name of the element referenced by r. In the examples above with doc1.XML and doc2.XML, r1.getLabel evaluates to "B" and r2.getLabel evaluates to "C".

Navigation through XML-documents is done using the functions getFirst(_,_), getNext(_), and parent(_). The first argument of all three functions is a reference to an element inside an XML-document. Given a reference r, r.getFirst ("A") evaluates to a reference to the first element A directly inside the start and end-tags of r. Nested instances are not considered. In the examples with doc1.XML and doc2.XML, the reference r1 can be obtained by means of the term getRef("doc1.XML"), which evaluates to <A>, and the reference r2 can be obtained by means of the term getRef ("doc2.XML"), which evaluates to <C>.

If there is no element with the requested name, getFirst evaluates to the constant undef. Further getRef does not refer to nested elements. Referring to the above examples, getRef (doc1.XML).getFirst("A") does not evaluate to a reference to the inner A-element, but to undef. In order to get a reference to the inner A-element, one uses getRef (doc1.XML).getFirst("B").getFirst("A").

As a consequence of the definition of getFirst, either r.getFirst("1").getLabel="1" or r.getFirst("1")=undef, for any reference r, and label "1".

The function getNext(_,_) returns a reference to the next element with the same label, if existing, otherwise undef is returned. Given a reference r to the following XML-fragment:

```
<A>
    <B x="1"></B>
    <B x="2"><B x="3"></B></B>
    <Bx="4"></B>
</A>
```

The reference r.getFirst("B") references the B-element with x="1", the reference r.getFirst("B").getNext references the B-element with x="2", the reference r.getFirst("B").getNext.getNext references the B-Element with x="4". In order to reference the B-element with x="3", one needs to write r.getFirst("B").getNext.getFirst("B").

The function "parent" maps a first element reference to a reference to the element's parent, i.e., to the element that encloses the first element. In the examples with doc1.XML and doc2.XML, r1.parent=getRef("doc1.XML") and r2.parent.parent=getRef("doc2.XML").

The function "<CopyList(_,_)" takes as a first argument a reference and as second argument an element name. r.Copy-List(a) assembles a string by concatenating all elements A directly (not nested) in r. Thus, given the example in the getNext paragraph above, r.CopyList results in the string "<B x="1"></B><B x="2"><B x="3"></B></B><Bx= "4"></B>", consisting of 3 B elements, the second of them containing by coincidence another, nested B element.

Finally, a function traverse is provided. Starting with a reference to the root, traverse enumerates all elements in the document in some order.

Now, in FIG. 9, the DTD for the modules is defined. The elements of this DTD are explained stepwise below. Typically, the modules are given in separate module-files. Of course, the DTDs are completed with a unique root element. However, a complete language with a list of all modules might be contained in one DTD. The topmost module-element is the root of these module-files.

The components of a module are a list of derived attributes, an optional expression, a list of states and a list of modules (sub-modules). The name-attribute indicates the element to which the module is applicable. The definitions are based on the assumptions that an element "X" is present in the document to be executed, that a XML-document called "moduleX.xml" whose root element is a "module"-element exists, and that the root element has a "name" attribute with the value "X".

```
<!element module (derived*, expression?, state*, module*)>
<!attlist module            name CDATA #REQUIRED
                            number CDATA "1">
```

The list of derived attributes contains attribute definitions that are given by functional dependencies from other attribute definitions. The optional expression gives a security condition that has to be fulfilled by each instance of such an element. The states are the (non-nested) states of each instance of such an element. Finally, the list of modules refers to the components or submodules of the element, each of which may contain states and further sub-modules. For the sub-modules, the number attribute denotes which instance it refers to. If it refers to the first instance, number has the value "1", and so on. If it refers to all instances, number can have the value "all".

```
<!element derived (argument*, expression)>
<!attlist derived name CDATA>
<!element argument EMPTY>
<!attlist argument name CDATA>
```

A derived attribute definition has two components: the arguments, available in the definition, and the actual definition, given as expression. The name-attribute gives the name of the derived attribute. A derived attribute is evaluated by setting the values of the arguments, and evaluating the defining expression.

The components of a state are a list of actions, to be triggered if the state is reached, and a list of transitions departing from the state. The name of the state is used to reference it as the target of some transition.

```
<!element state (action*, transition*)>
<!attlist state name CDATA>
```

The two components of a transition are an expression, guarding the transition, and a path, denoting the target of a transition. All expressions, paths, actions, and definitions of derived functions depend on their origin, i.e., on the root of the module, respectively its instances in the XML-document to be executed.

```
<!element transition (expression, path)>
```

A path consists of an optional component, and an attribute state. The state denotes the name of the state the path points to. Typical states are "initial" for the initial state, and "terminal" for the final state(s). The component refers to nested components, the attribute number denotes again the chosen instance. If the value of number is "all" the path corresponds to a family of paths to all instances.

```
<!element path (component?)>
<!attlist path state CDATA "initial">
<!element component (component?)>
<!attlist component   name CDATA #REQUIRED
                      number CDATA "1">
```

Expressions are used in various places and are defined as follows:

```
<!element expression (path | self | src | trg | evalattr | getfirst |
                      getnext | parent | root | apply | external | constant)>
```

Paths used as expressions evaluate to the corresponding element and not to the state referenced by the path. Self evaluates to the element that is the instance of the module containing the definition wherein self is used. Src evaluates to the element containing the state that has been executed last, if used in actions, and to the element containing the source of a transition, if used inside a transition. Trg evaluates to the element containing the target of a transition. Evalattr, getfirst, getnext and parent evaluate to the corresponding primitive functions described above. Root evaluates to the root of the document that is executed. Apply is used for built in binary and unary operators, like arithmetic operators (+,−,* , . . . ), Boolean operators (and, or, not, . . . ), and string operators (append, concatenate, . . . ). External is used to call external functions, written in arbitrary programming languages. Finally, constant is used to denote constant like numbers, i.e., Booleans, and strings.

In the flow charts, an abstract function evaluate(_) is used to evaluate expression elements.

Actions are triggered if a state is reached and are of the structure:

```
<!element action (setAttr|ifthen|forall|external)>
```

The setAttr action corresponds to the setAttr primitive described above. Ifthen is used to execute certain actions only under certain conditions, and the forall is used to execute an action for all instances of a certain element in a document. The external construct is again used to call external functions.

In the flow charts, an abstract procedure execute(_)is used to execute action elements.

Since the definitions should be valid independent of the concrete choice of expression and action grammar, the DTD according to FIG. 9 is completed with the remaining rules starting at line 19 with the element <!element src EMPTY>.

With reference to FIGS. 10 to 16 the execution of a given XML-document doc.xml shall be explained more in detail. FIGS. 10 to 16 show six fixed flow charts F1, F2, F2, F3, F4 and F7 that specify the execution process. In contrast to the GFCs described in the context of the first embodiment, these flow charts do not depend upon the document to be executed and the robot-modules but are fixed for any document and any robot-module. Each flow chart refers to a logical block of the execution of a given XML-document doc.xml to be executed. The modules are provided as separate files moduleX.xml for each element-name X. The states of each flow chart are referenced as [Fx.Sy] where x represents the number of the flow chart and y represents the state number within the corresponding flow chart.

According to the invention, the XML-document (or in other embodiments a DTD) is first traversed and all states and transitions from the modules are copied into the XML-document. Subsequently, the XML-document is executed standalone, that is, the XML document does not make a call to an external DTD. During the copying process, the "origin" attribute of each state is set to the element currently traversed, e.g. the element from which the copy action has been triggered. The values of the origin attribute are thus references to elements of doc.xml.

Figure 10:
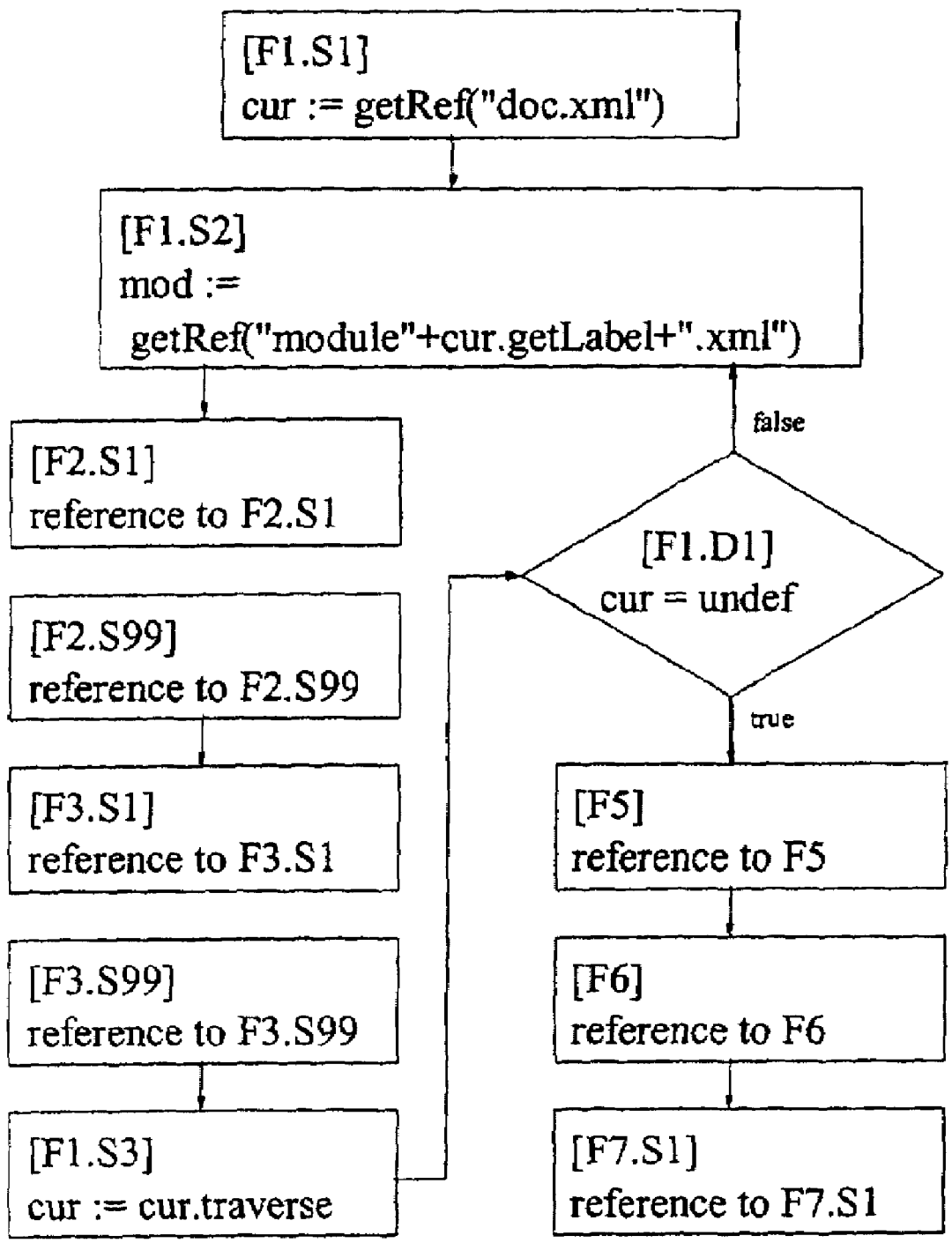
FIGS. 10a and 10b and 11-15 show the flow charts defining the execution of a given XML-document using modules valid with respect to the DTD XML-robot.dtd.
Figure 10B:
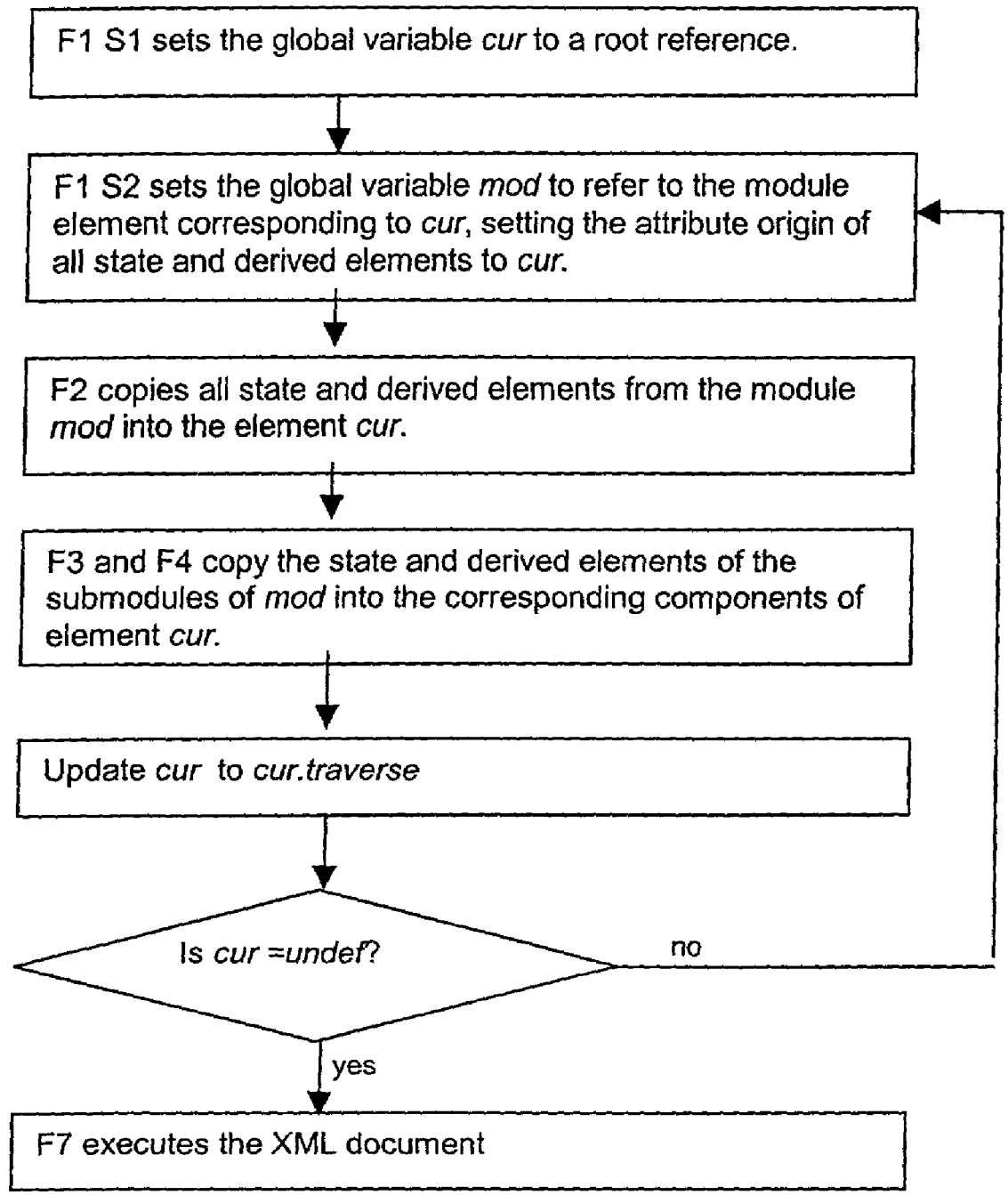
Figure 11:
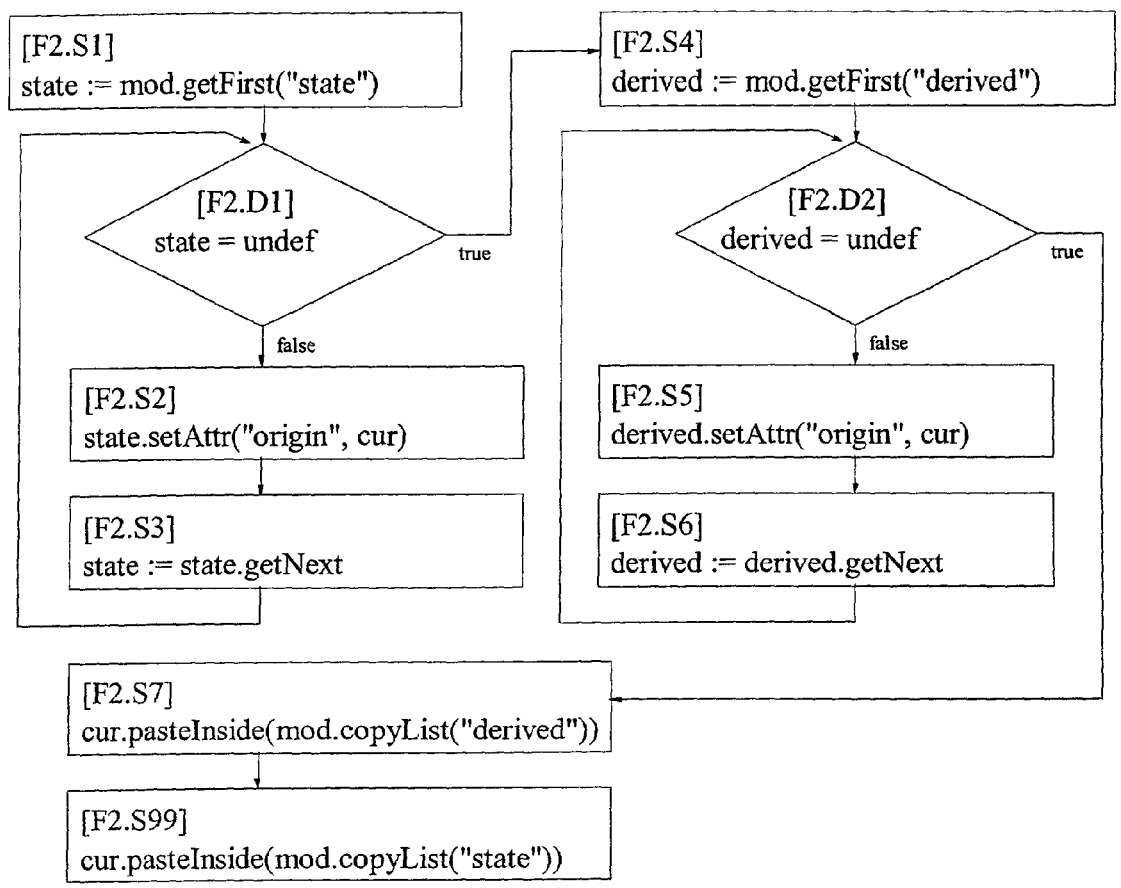
Figure 12:
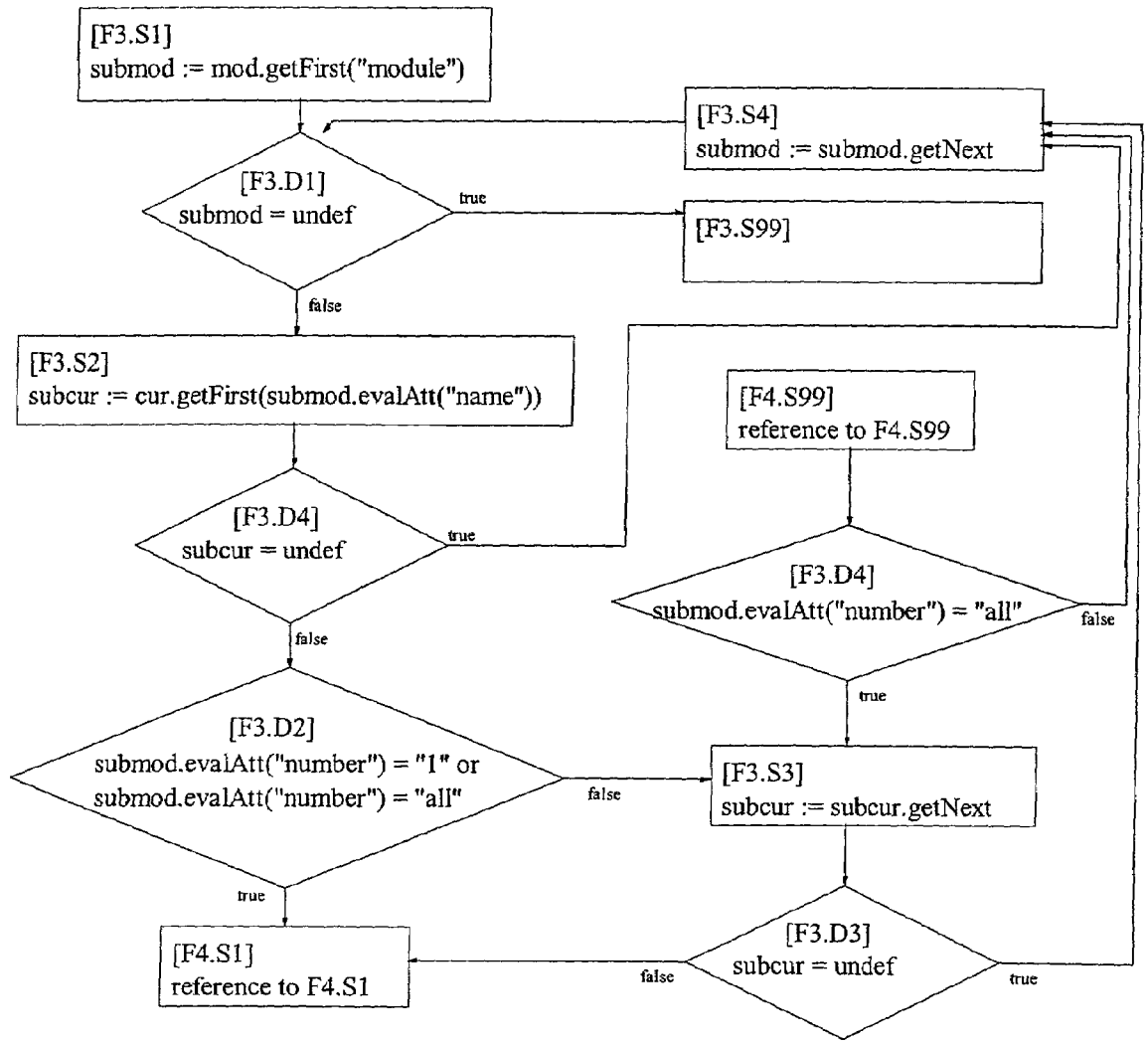
Figure 13:
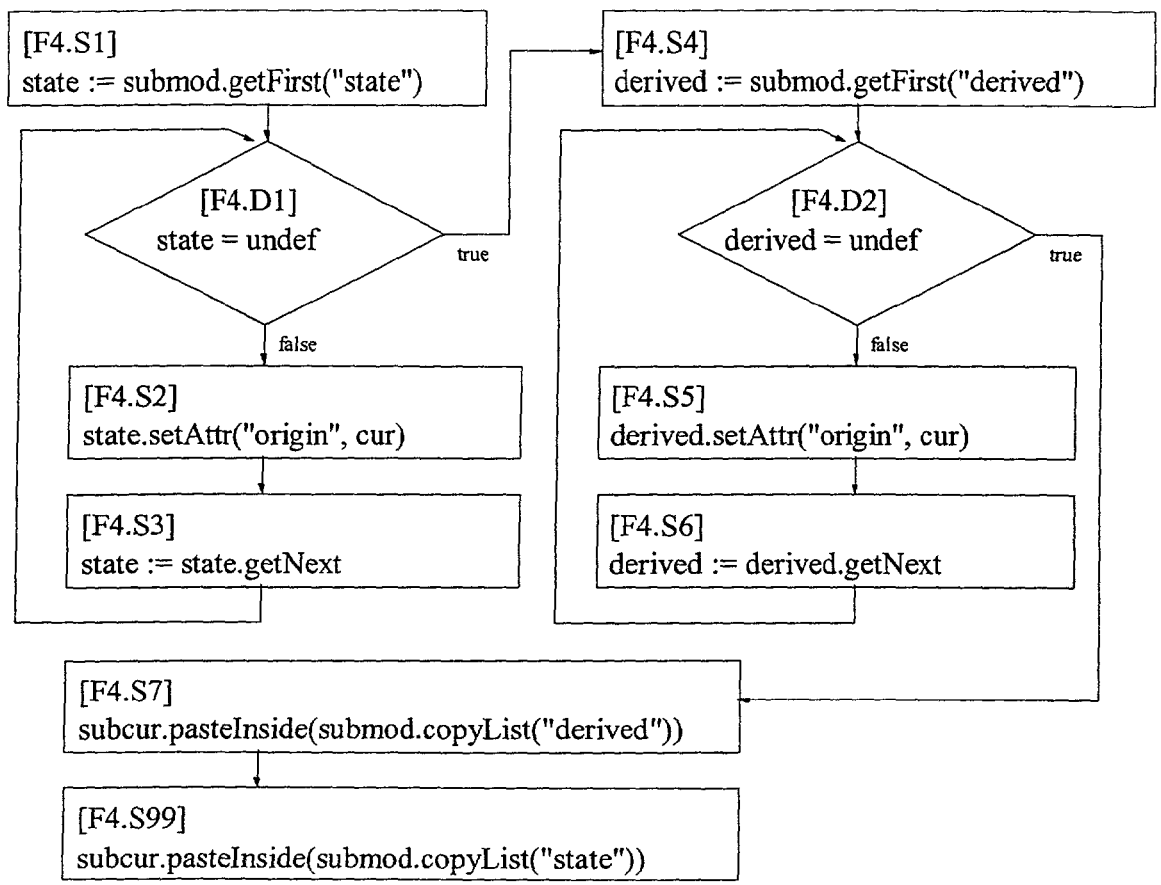

The initial state of the execution, shown in FIG. 10, is [F1.S1]. The value of the global variable cur is set to refer to the root of the document "doc.xml". Then the control is passed to state [F1.S2], setting the value of the global variable mod to be a reference to the "module" element describing the execution behavior of the root, e.g. the module having the name corresponding to the label of cur. Then control is passed to the state [F2.S1] of the flow chart F2. The purpose of F2 is to copy all "state"- and "derived"-elements from the module mod into the element cur, setting the attribute "origin" of all state and derived elements to cur. From F2'last state [F2.S99] control is passed to F3'first state [F3.S1]. The purpose of F3 is to copy the "state"- and "derived"-elements of the sub-modules of module mod into the corresponding components of element cur, still setting the attribute "origin" of all "state"- and "derived"-elements to cur. From F3's last state [F3.S99] control is passed to [F1.S3], updating cur to cur.traverse. Then the decision [F1.D1] branches upon the condition cur=undef. If the condition evaluates to true, the traversal terminated, and control is passed to [F5], otherwise control is passed back to [F1.S2].

Module F5 may contain supplemental procedures to process modules nested in nested modules and to check security conditions. These procedures are optional and may be implemented using standard process structures. From [F5] control is passed to [F6]. Again, module F6 is optional and contains states, transitions and derived attributes being reordered according to different policies. Policies can include preferences on the conditions in transitions. From [F6] control is passed to the first state of F7, to [F7.S1].

As noted, the purpose of F2 (FIG. 11) is to copy the "state"- and "derived"-elements of module mod into element cur, and to set the "origin"-attributes of those elements to cur. Rather than first copying the elements and then setting the attributes, the attributes are set to a value in module mod, and subsequently the "state"- and "derived"-elements are copied from module mod into element cur. A global variable state is used to range over "state"-elements in mod, and a global variable derived is used to range over "derived"-elements. The first state [F2.S1] sets variable state to the first "state"-element in mod. Then control is passed to [F2.D1]. As noted above, [Fx.Dy] represents a particular decision in a particular flow chart. Control is passed from [F2.D1] to [F2.S3] if state undef, and to [F2.S4] otherwise. In [F2.S3], which is reached if state is not undef, the attribute "origin" of state is set to cur. From there control is passed to [F2.S3], setting state to state.getNext. From there control goes again to the decision [F2.D1]. In [F2.S4], which is reached after all "state"-elements have been copied, the global variable derived is set to the first "derived"-element. In the same way as for the "state-elements, the decision [F2.D2], branching upon derived=undef, and the state [F2.S6], triggering derived::=derived.getNext, are used to iterate over all "derived"-elements. In [F2.S5] the "origin"-attribute is set to cur.

If the iteration terminates, control is passed to [F2.S7], pasting the complete list of derived elements into cur. Then in [F2.S99], the list of "state"-elements is copied from mod and pasted into cur.

In F3 (FIG. 12), all sub-modules of mod are visited, using the iteration variable submod. If the iteration terminates, e.g. if the decision [F3.D1] evaluates submod to undef, then control is passed to the last state of F3, [F3.S99]. Otherwise, control is passed to [F3.S2], where the variable subcur is set to the first component whose label matches the label of the sub-module submod. If the "number"-attribute of the sub-module submod is "1" or "all", subcur is correctly set to the first instance and control is passed from decision [F3.D2] to the first state of F4, [F4.S1]. Otherwise, in [F3.S3] subcur is set to the next instance, and control is passed to the decision [F3.D3] which checks whether subcur is undef. If not, there is the assumption that the second instance or all of them have to be checked, and control is again passed to the state [F4.S1]. The purpose of F4 is exactly the same as that of F2, but instead of mod and cur, one uses submod and subcur, except for the attribute "origin" which is set to cur.

From the final state [F4.S99] control is passed to the decision [F3.D4]. If the branch condition evaluates the "number"-attribute of submod to "all", control is passed to [F3.S3], traversing all instances with the right label. If that traversal stops, by triggering decision [F3.D3] to true, or by finding in decision [F3.D4], that number was not "all", the visiting of all sub-modules is continued in state [F3.S4]. There submod is set to the next instance of "module"-elements. From [F3.S4] control is passed again to the decision [F3.D1], which as noted, either continues the visiting of sub-modules or sends control to the last state of F3, i.e. [F3.S99].

As mentioned above, F4 (FIG. 13) works exactly like F2. The variables state and derived are used to iterate over the "state"-elements and "derived"-elements of module submod, setting their "origin"-attribute to element cur. Then all "state"- and "derived"-elements are copied and pasted into the element subcur.

At state [F4.S99] all "state"-elements and "derived"-elements are copied into the corresponding elements of the document doc.xml and the "origin"-attribute is set, such that the modules are not needed anymore. Since only an attribute of state has to be set and all "transition"-, "action"-, and "derived"-elements are and remain untouched. An alternative is to copy only the outermost part of the "state"-elements and "derived"-elements, and to use references to the modules for the rest.

Figure 14:
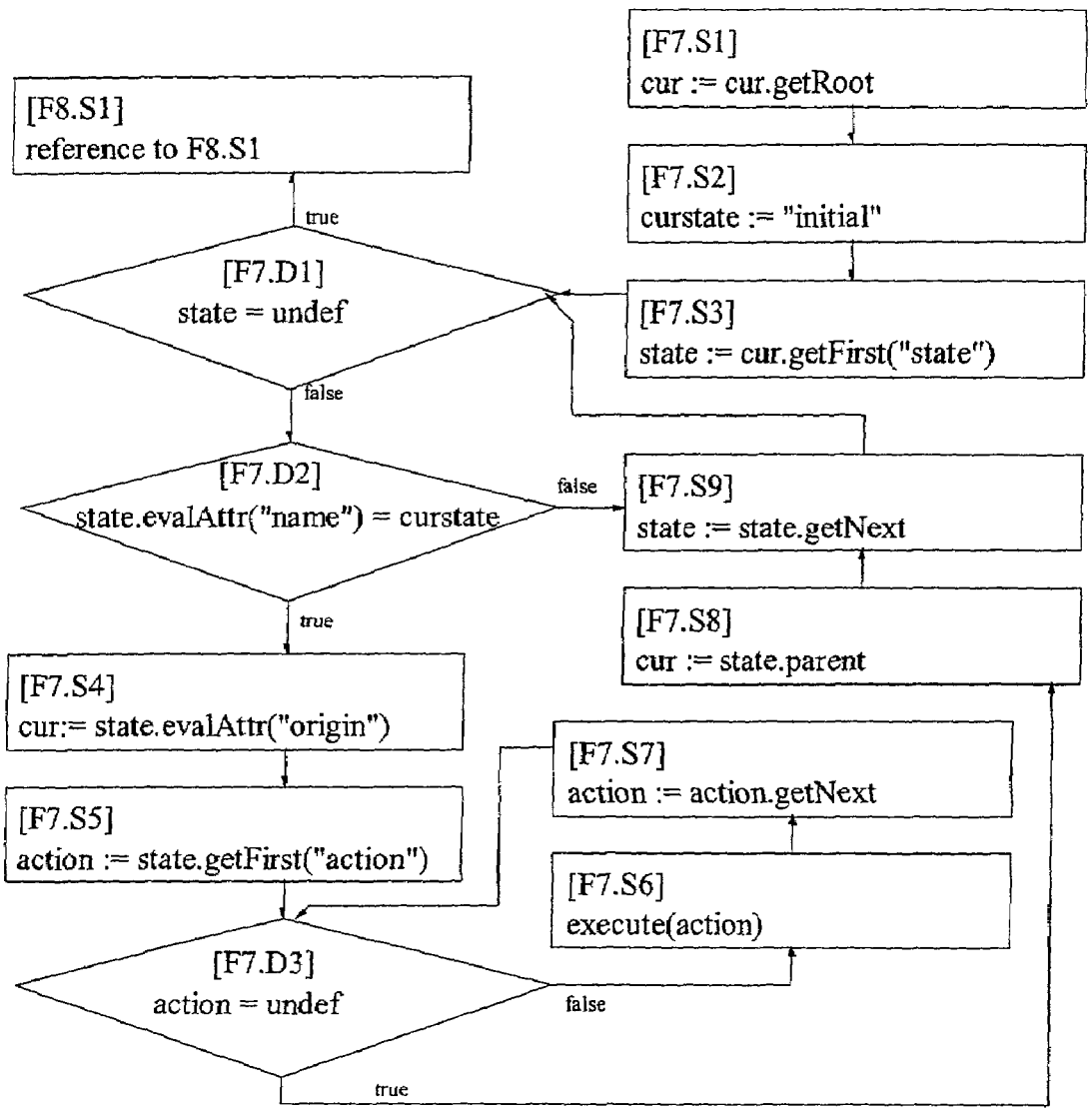

The first state [F7.S1] of flow chart F7, shown in FIG. 14, denotes the beginning of the actual execution phase. In F7, the actions of all states matching the current-state curstate are triggered.

[F7.S1] sets cur back to the root of the document doc.xml. Then control goes to [F7.S2], where the global variable curstate is set to "initial". The purpose of curstate is to indicate the current state, inside the current element cur. In [F7.S3], [F7.D1] and [F7.S9] the variable state is iterated over all "state"-elements of the current element cur. [F7.S3] initialized the iteration, [F7.D1] is the termination criteria, sending control to [F8.S1] if it terminates and [F7.S9] is the actual iterator that sets state to the next instance of "state"-elements. Inside the iteration, the decision [F7.D2] checks whether the "name"-attribute of state matches the current state curstate. If so, [F7.S4] is visited next, setting variable cur to the value of attribute "origin" of state. The purpose of this update is to evaluate the actions in the right environment. In [F7.S5], [F7.D3], and [F7.S7] the variable action is iterated over actions inside state, and all of them are executed in [F7.S6]. When that iteration terminates, control is passed to [F7.S8] where the value of cur is reset to its original value. From there the iteration over states is entered again, leading after termination to [F8.S1 ]

Figure 15:
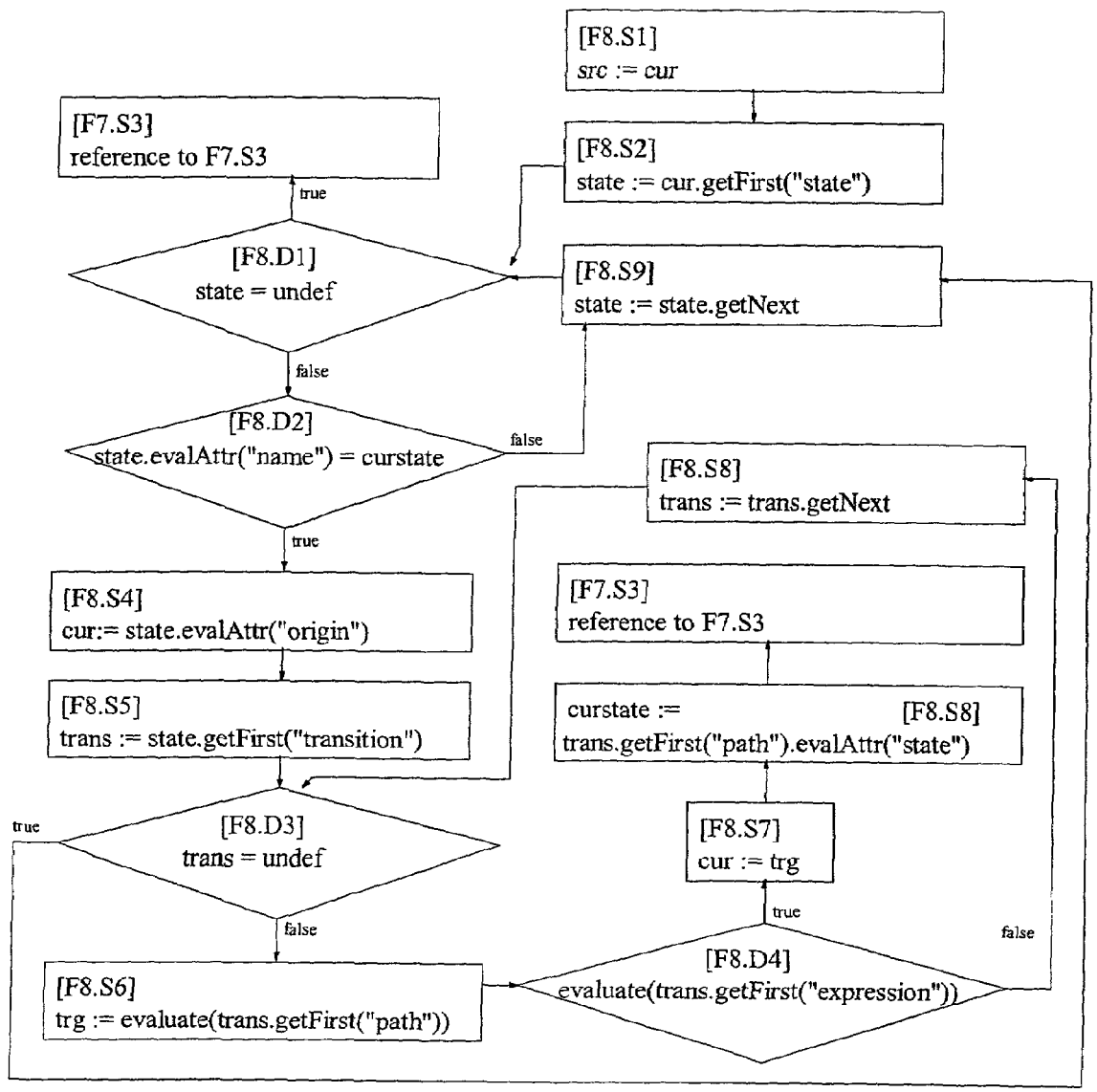

Finally, in F8, shown in FIG. 15, the transitions are triggered, updating the current element cur, and the current state curstate. The evaluation of the transition conditions depend on the origin of their definition, the source-element src of the transition, and the target-element trg of the transition. In the "expression"-element denoting the condition, the three elements can be accessed as <self/>, <src/>, and <trg/>, respectively. In flow chart F8, two nested iterations take place over the "state"-elements and over their "transition"-elements. The first state [F8.S1] sets src to the current element cur. Then [F8.S2], [F8.D1], and [F8.S9] iterate the variable state over all states in the current element cur. If the iteration terminates, control is passed back to [F7.S3], executing again the same actions. Otherwise, [F8.D2] checks whether the "name"-attribute of state matches the current state curstate. If so, [F8.S4] is entered, and cur is set to the value of attribute "origin". Then, [F8.S5], [F8.D3], [F8.S8] are used to iterate variable trans over all transitions inside state. Inside the iteration, [F8.S6] sets trg to the result of evaluating the path. Then [F8.D4] checks whether the expression of trans evaluates to true. For this evaluation, the correct settings of cur, src, and trg are needed. If the result of the evaluation is true, cur is set to trg, and curstate is set to the "state"-attribute of the path-component of trans. Then control is passed to [F7.S3] in order to execute the actions of the new current element and state.

In FIGS. 16, 17, and 18 modules of the query language example according to FIG. 1ff are shown. These modules are valid with respect to the DTD given in FIG. 1. The execution of the sample XML-document can be performed using the process described in FIG. 10ff. Said modules may be automatically generated from a graphical input according to the graphical flow charts described above. On the other hand, their graphical representation could be generated from the textual form given here.

With reference to FIGS. 19(a)-19(d) the implementation of a XML-robot specification that gives the execution behavior of XML-documents as explained above is described in further detail. Given a XML-robot specification m0, written in a XML-robot specification language M, such as the visual/textual query language described above, and an XML-document d valid with respect to m0's document type definition DTD0, the execution specification gives all information on what an abstract process m0Exec(d) shall do in order to execute d. In order to implement the abstract process m0Exec(d) a program is needed that can be executed on existing computers, e.g., a program written in a programming language such as C or Java. There are four basic ways to implement such a program.

Figure 19A:
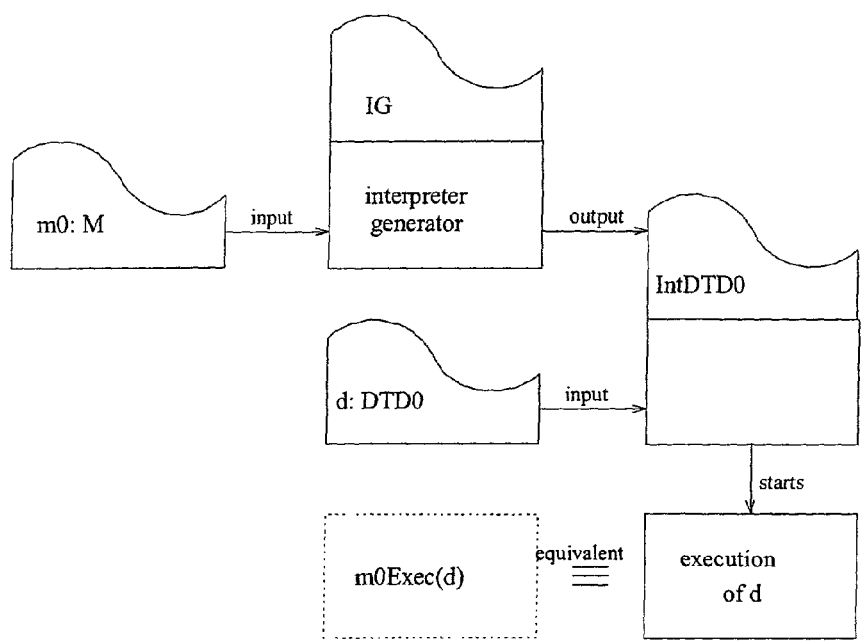
FIGS. 19(a)-19(d) show embodiment of a method for implementing a specific XML-robot specification.
Figure 19B:
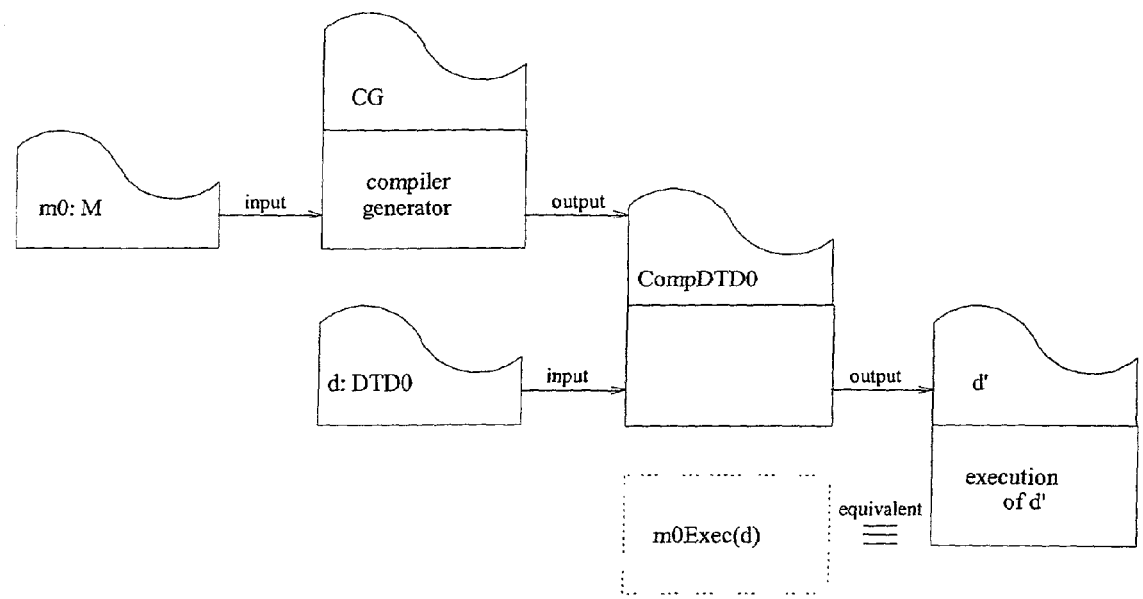
Figure 19C:
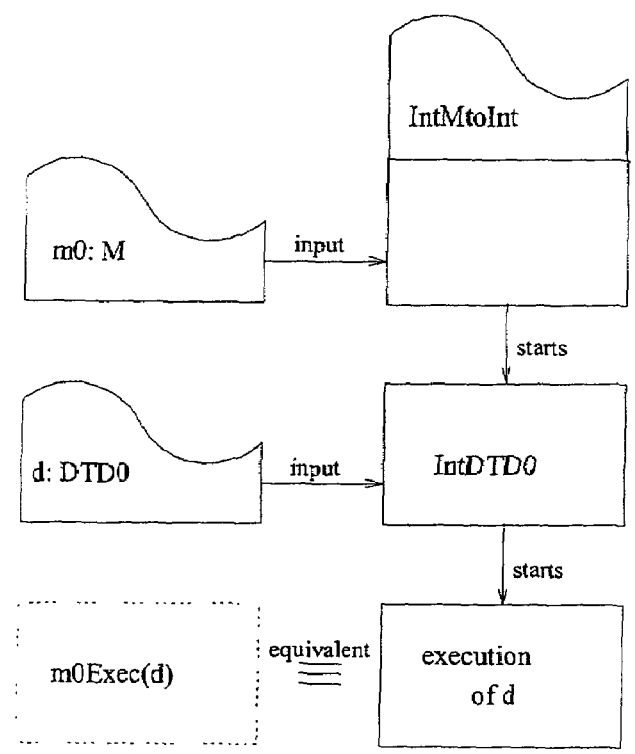
Figure 19D:
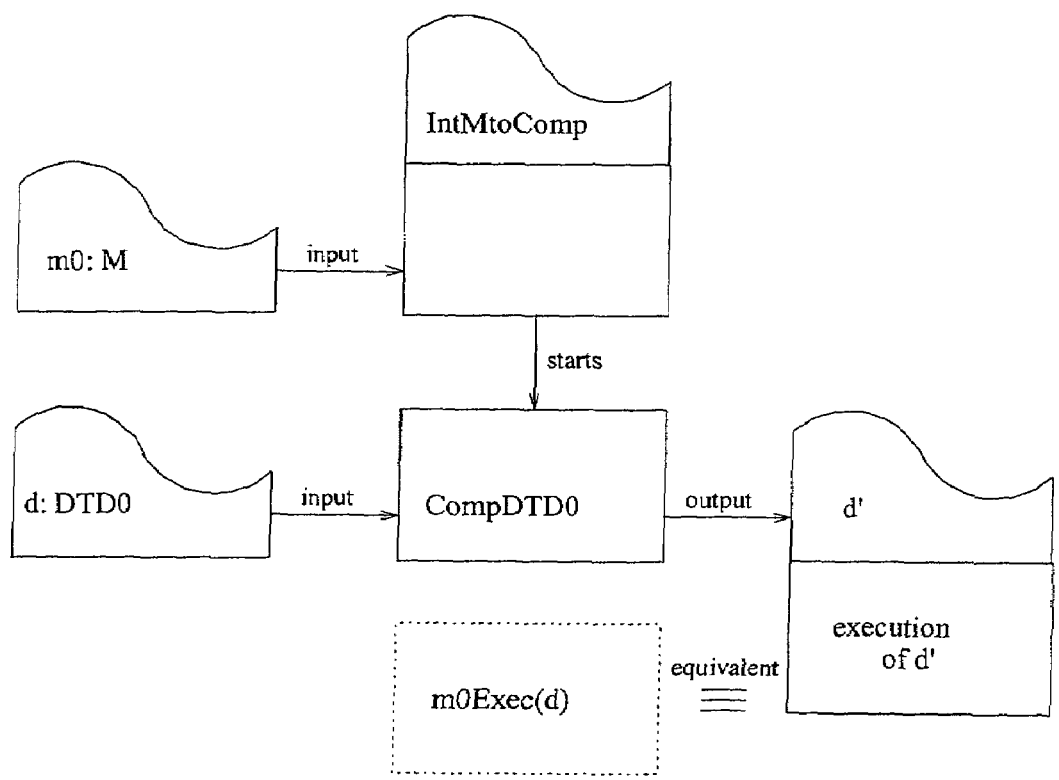

In the FIGS. 19a-19d processes are visualized as boxes, documents are visualized in the usual way, i.e. a box with a curved upper side, and an executable document, e.g., a program, is visualized as a combination of a document and a process. Each process may have an input, in the form of documents, and an output, in the form of documents, and a process may start another process. Concrete processes, which can be executed on a real machine are shown as boxes with continuous lines, and abstract processes, such as the process m0Exec(d) are shown as boxes with dotted lines. The described possibilities of implementing XML-robots are different combinations of compiler and interpreter techniques. Either one of the techniques can be used for the meta formalism M and the formalism DTD0. Thus, there are typically four combinations, a compiler followed by an interpreter (FIG. 19a), a compiler followed by a compiler (FIG. 19b), an interpreter followed by an interpreter (FIG. 19c) and an interpreter followed by a compiler (FIG. 19d)

FIG. 19(a) shows an implementation by generating an interpreter IntDTD0 from the XML specification m0. The Interpreter IntDTD0 takes as input a XML-document d and checks whether it is valid with respect to DTD0. Subsequently it starts a process executing such a document d, in such manner that the process is equivalent to the above introduced abstract process m0Exec(d). The implementation is given by an executable document IG, whose execution takes as input an XML-robot execution specification m0 and generates as output an executable document IntDTD0.

FIG. 19(b) visualizes a next possibility by providing a compiler generator given by an executable document CG that generates a compiler CompDTD0 from the XML specification m0. The compiler CompDTD0 transforms a document d, received as input, into an executable document d' whose execution is equivalent to the abstract process m0Exec(d).

FIG. 19(c) shows an interpreter IntMtoInt of the specification language M starting an interpretation process of m0. The interpreter IntMtoInt takes as input a XML-robot specification m0 and starts a process IntDTD0 that takes as input a XML-document d. The process IntDTD0 now starts a subsequent process executing the document d which process is equivalent to the abstract process m0Exec(d).

Finally, FIG. 19(d) shows an interpreter IntMtoComp of the specification language M. The interpreter IntMtoComp takes a XML-robot specification m0 as input, but starts, in contrast to the pre-described interpreter IntMtoInt, a compiler process CompDTD0, that takes as input a XML-document d, and generates as output an executable document d' whose execution is equivalent to the execution of the abstract process m0Exec(d).

It may be easily recognized that each of the above possibilities has specific advantages and drawbacks. As known, the advantage of using interpreter technology is the immediate availability of the execution, the advantages of the more complex compiler technology are both a better performance and the availability of the generated executable documents, which can be reused separately, independent from the XML-robot specification m0.

Figure 20:
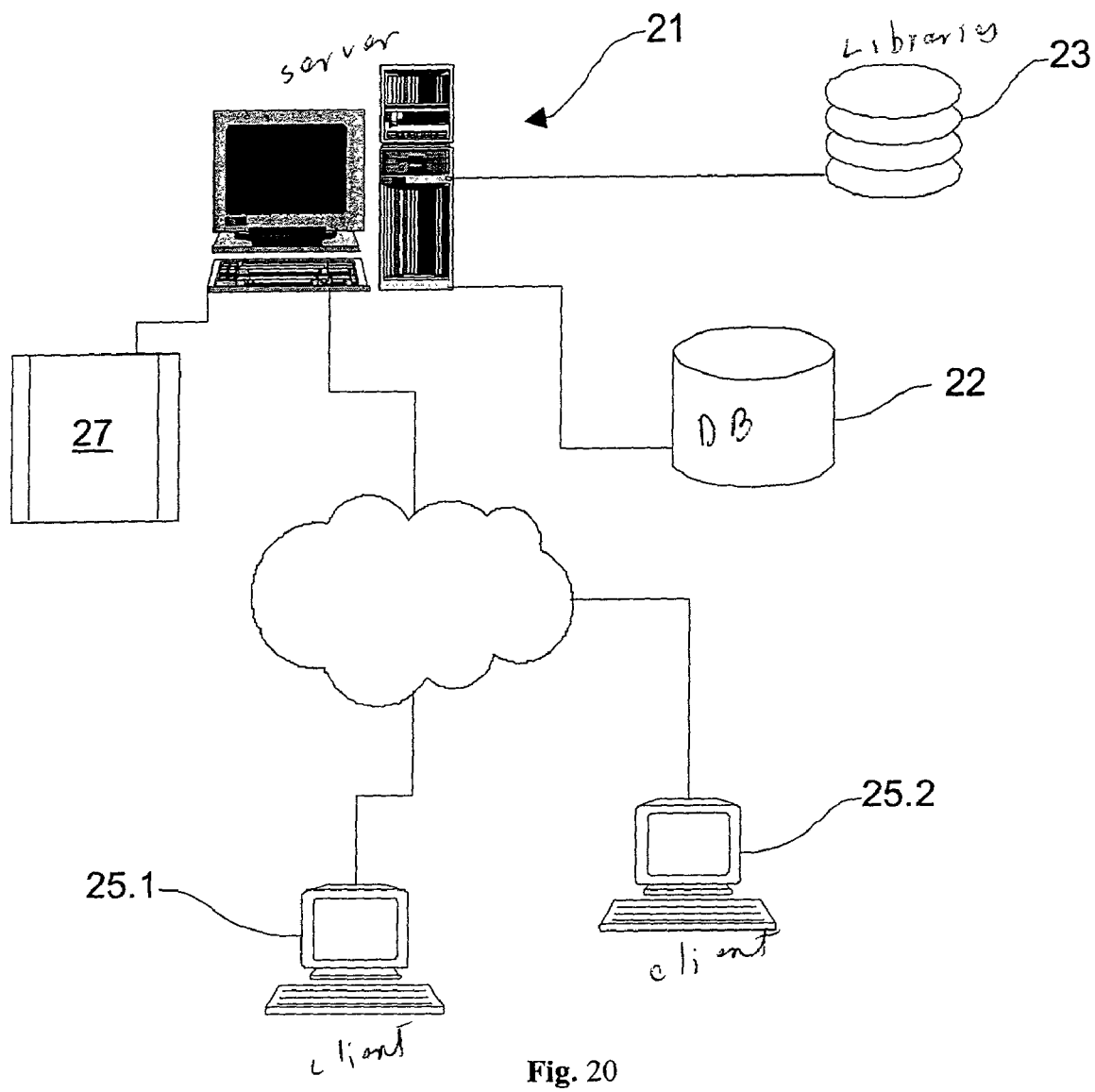
FIG. 20 shows an overview of an embodiment for a web-based XML-robot.

In FIG. 20 an embodiment of a web-based XML-robot is shown. A server 21, typically a powerful web-server, is connected to a database 22 and one or more libraries 23 of functionalities. By network connections, e.g., over the Internet, one or more clients 25.1, 25.2, typically using a browser running on a remote system, may access the server 21. The capabilities of these clients 25.1, 25.2 are more or less limited and may typically run limited abstract machines like the Java Virtual Machine.

The Server 21 provides the service to execute XML-documents according to a XML-robot specification as described above. The actions in the XML-robot specification are actions to be executed on the server 21, e.g. access to the server's database 22 or calls to the server's libraries 23 of functionality. In addition there are actions and possibly additional equipment 27 available for publishing results via e-mail, web pages, WAP, SMS and the like, managing access rights and managing the architecture of the underlying databases and software systems. The XML-robot specification may be executed on the server 21 only. However, additional equipment 27 may document the services provided to the client.

The situation is comparable to an Application Service Provider (ASP) model, where applications are run on a server, and a variety of clients can access the applications. The present invention shares the advantage of an ASP model that all computation is done on the server, and thus, the clients can be very small devices like Internet appliances. Furthermore, the invention has the advantage that a finite XML-robot specification can execute infinite many different XML-documents matching the corresponding DTD.

The applications of the Execution Service Provider approach range from input/control of existing applications to the specification or even programming of new applications. The input/control applications use the XML-documents to control an application. The XML-robot specification would simply translate the documents into interactive input/control sequences for the application to be controlled. In the case of specification/programming of new applications, the XML-documents correspond to syntax trees of programs and the XML-robot specification gives the execution behavior. For example, a XML-robot specification, with a DTD representing syntax trees for the programming language C, and that provides the execution behavior for the syntax trees, would allow a developer to send arbitrary C programs to the server and to have them executed there.

In contrast, to the pre-described embodiment with an Execution Service Provider another preferred embodiment may provide LangLets (small XML-robot specifications) and Mobile Languages, respectively. Here the Server 21 provides services to the clients 25.1, 25.2 by first sending an XML-robot specification and then XML-documents that should be executed according to the specification. This embodiment requires clients 25.1, 25.2 that are able to generate an interpreter/compiler from the XML-robot specification to execute the XML-documents. The actions of the XML-robot specification are accordingly executed on the clients 25.1, 25.2. This approach may in a wider sense be compared to sending Java code to a client, which subsequently executes the code. However, the execution behavior given by an XML-robot specification is a lot easier to execute and far less expressive than full Java. A language like Java may nevertheless be used to program the actions of the XML-robot specification. The execution behavior of all XML-documents (infinite many) executed according to such an XML-robot specification is then restricted to the finite number of fixed (but parameterized) Java-actions in the XML-robot specification.

It is an important advantage of the present invention that security properties of a finite XML-robot specification may be investigated. These properties may then be guaranteed or checked, respectively, for an infinite number of different XML-documents that are intended to be executed on the clients 25.1, 25.2. If, for instance, a certain critical security action is not contained in the actions of the XML-robot specification, it may be guaranteed (based on the definitions directly) that this action is not executed for any XML-document executed according to that XML-robot specification. Or, if another critical security action is only triggered by a state that is guarded by a certain condition, it can be guaranteed that this action is only triggered if this condition is fulfilled.

Again, it may be helpful to think of mobile code, where source code is sent over the net. However, in contrast to that, here a XML-robot specification is first sent, giving the execution behavior of the mobile language/DTD and then the programs/XML-documents are transferred. Thus, a mobile language is provided over a given network. The advantage of mobile languages over mobile code is, that repetitive computations are embedded in a generic way in the XML-robot specification, and the XML-documents describing the actual instances of the computations are less complex.

Such use of the inventive XML-robot allows the definition of a new language and the execution of the code written in the new language, after having generated a corresponding compiler and/or interpreter. It is furthermore possible to build editors, debuggers and analysis tools. The described data and code synergies allow an embodiment of the invention to define directly the execution or other processing of a valid XML-document, without writing a separate program that explicitly parses and analyses the structure tree of such document.

The invention provides an apparatus 25.1, 25.2, particularly Internet appliances, that may be used within a network environment, e.g., the Internet, that includes a system for receiving data from, and sending data to, a remote computer. The apparatus provides systems for storing and accessing data (XML-document) being sent from a remote computer. The apparatus preferably comprises a system that can examine such data received from the remote computer and, if applicable, validate when such data is a valid and/or accepted XML-robot specification. The apparatus furthermore comprises a system that may integrate the XML-robot specifications with an XML-document. The XML-document is then executed by the apparatus, preferably by a processing unit, that may execute the instructions of the XML-documents. It is easily understood by somebody skilled in the present technical field, that the systems according to the invention can be integrated in such manner that, e.g., the processing unit for execution of the XML-document may provide functionality for the sending/receiving operation of this apparatus. Furthermore, the apparatus typically comprises a user interface that may provide, if desired, means to animate execution and analysis of XML-documents or XML-robot specifications. However, it may serve as a service station within a network only.

The invention furthermore provides an apparatus that comprises means for graphical display of XML-robot specifications, e.g. as described with reference to FIG. 3 et seq., in an advanced visual integrated development environment. According to the specification above, these graphical representations are used to generate XML-documents representing the XML-robot specifications.

The invention furthermore allows distributed execution of XML-documents. Multiple XML-robots arecan be used to distribute a computation of XML-Documents because the structure of the documents is at the same time the structure of the application that processes them. Accordingly, parts of an XML-Document can easily be executed on different instances of the XML-robot that may be located at different sites. Similarly, special applications may require part of the document to be executed on the server and part of the document on the client side.

What is claimed is:

1. A method for the direct execution of an XML-document in a data processing system, comprising:
    defining a local behavior and process for each element of the XML-document;
    integrating executable instructions within at least one from a group of the XML-document and a document type definition (DTD) corresponding to the XML-document; and storing intermediate states of an execution process of the executable instructions in a memory of the data processing system by dynamically creating and redefining attributes of elements of the XML document, where the intermediate states define intermediate states of the execution process of the executable instructions.

2. The method according to claim 1, further comprising:
(a) integrating executable instructions by defining for each XML element definition and its instances an action made up of executable actions, and actions which are references to either the action defined for one of the components of the element or to an action defined for any other element of the XML document; and
(b) executing an XML-document by executing the action defined for the root of the XML document.

3. The method of claim 2, further comprising the step of:
defining the composition of the action for at least one XML-element definition or instance by graphical flow charts representing sequential or concurrent control- and/or data-flow.

4. The method of claim 2, further comprising the step of:
defining the composition of the action for at least one XML-element definition or instance in textual form representing sequential or concurrent control- and/or data-flow.

5. The method according to claim 1, further comprising:
defining a composition of the action for at least one XML-element definition or instance by graphical flow charts.

6. The method according to claim 1, further comprising:
defining the composition of the action for at least one XML-element definition or instance in textual form.

7. The method according to claim 1, further comprising:
representing system states in terms of n-dimensional data cubes;
providing an open interface by making the n-dimensional cubes readable and writeable for other programming and database systems; and
making data structures and functionalities of other programming and database systems accessible using executable instructions.

8. The method according to claim 1, further comprising modules stored in the memory of the data processing system that define a process for each element, where the modules are valid with respect to the following DTD (Document Type Definition), which is also stored in a memory of the data processing system:

```
<!element module (derived*, expression?, state*, module*)>
<!attlist module       name CDATA #REQUIRED
                       number CDATA "1">
<!element derived (argument*, expression)>
<!attlist derived name CDATA>
<!element argument EMPTY>
<!attlist argument name CDATA>
<!element state (action*, transition*)>
<!attlist state name CDATA>
<!element transition (expression, path)>
<!element path (component?)>
<!attlist path state CDATA "initial">
<!element component (component?)>
<!attlist component    name CDATA #REQUIRED
                       number CDATA "1">
<!element expression (path | self | src | trg |
                              evalattr | getfirst | getnext |
                              parent | root | apply | external |
                              constant)>
```

-continued

```
<!element action (setattr | ifthen | forall | external)>
<!element src EMPTY>
<!element trg EMPTY>
<!element self EMPTY>
<!element evalattr (expression?)>
<!attlist evalattr attribute CDATA #REQUIRED>
<!element getfirst (expression?)>
<!attlist getfirst attribute CDATA #REQUIRED>
<!element getnext (expression?)>
<!element parent (expression?)>
<!element root EMPTY>
<!element apply (expression, expression?)>
<!attlist apply op CDATA #REQUIRED>
<!element external (expression*)>
<!attlist external name CDATA
language CDATA>
<!element constant EMPTY>
<!attlist constant value CDATA #REQUIRED>
<!element setAttr (expression?, expression)>
<!attlist setAttr attribute CDATA #REQUIRED>
<!element ifthenelse (expression, action*)>
<!element forall (action*)>
<!attlist forall range CDATA "all-elements"
variable CDATA>.
```

9. The method of claim 1, further comprising:
modules stored in the memory of the data processing system that define a process for each element.

10. A method for the direct execution of XML documents comprising:
providing an execution specification including
a DTD;
graphical flow charts; and
transition rules;
providing an XML document instance including
an XML document;
using the DTD to validate the XML document;
constructing an attributed structure tree from the XML document;
decorating the attributed structure tree with the graphical flow charts to create a global flow chart; and
executing the global flow chart according to the transition rules to directly execute the XML document.

11. A computer-readable medium having computer-readable instructions for performing a method for the direct execution of XML, the method comprising:
providing an execution specification including
a DTD;
graphical flow charts; and
transition rules;
providing an XML document instance including
an XML document;
using the DTD to validate the XML document;
constructing an attributed structure tree from the XML document;
decorating the attributed structure tree with the graphical flow charts to create a global flow chart; and
executing the global flow chart according to the transition rules to directly execute the XML document.

12. A computer-readable medium having computer-readable instructions for performing a method for the direct execution of XML-documents, the method comprising:
defining a local behavior and process for each element of the XML-document;

integrating executable instructions within at least one from a group of a document type definition (DTD) corresponding to the XML-document and the XML-document; and storing intermediate states of an execution process of the executable instructions in a memory of the data processing system by dynamically creating and redefining attributes of elements of the XML document, where the intermediate states define intermediate states of the execution process of the executable instructions.

* * * * *

UNITED STATES PATENT AND TRADEMARK OFFICE
CERTIFICATE OF CORRECTION

PATENT NO. : 7,340,728 B2  Page 1 of 1
APPLICATION NO. : 09/921298
DATED : March 4, 2008
INVENTOR(S) : Phillip W. Kutter It is certified that error appears in the above-identified patent and that said Letters Patent is hereby corrected as shown below:

Col. 1, line 8, delete "of Kutter, filed Aug. 2, 2000," and insert --filed on August 2, 2000 by Phillip Kutter--

Signed and Sealed this

Fifth Day of August, 2008

JON W. DUDAS
*Director of the United States Patent and Trademark Office*